US010508873B2

(12) United States Patent
Sheppard

(10) Patent No.: US 10,508,873 B2
(45) Date of Patent: Dec. 17, 2019

(54) HEAT EXCHANGER WITH DUAL INTERNAL VALVE

(71) Applicant: Dana Canada Corporation, Oakville (CA)

(72) Inventor: Jeff Sheppard, Milton (CA)

(73) Assignee: Dana Canada Corporation, Oakville, Ontario (CA)

( * ) Notice: Subject to any disclaimer, the term of this patent is extended or adjusted under 35 U.S.C. 154(b) by 330 days.

(21) Appl. No.: 15/646,271

(22) Filed: Jul. 11, 2017

(65) Prior Publication Data

US 2018/0010866 A1  Jan. 11, 2018

Related U.S. Application Data

(60) Provisional application No. 62/360,607, filed on Jul. 11, 2016.

(51) Int. Cl.
*F28F 27/02* (2006.01)
*F16K 11/07* (2006.01)
(Continued)

(52) U.S. Cl.
CPC .......... *F28F 27/02* (2013.01); *F01M 5/002* (2013.01); *F16K 11/0716* (2013.01);
(Continued)

(58) Field of Classification Search
CPC ...... F28F 27/02; F01M 5/007; F16K 11/0716; F28D 9/005; F28D 2021/0089; F01P 7/16;
(Continued)

(56) References Cited

U.S. PATENT DOCUMENTS

| 4,881,594 A | 11/1989 | Beamer et al. |
| 6,056,045 A | 5/2000 | Matsuzaki et al. |

(Continued)

FOREIGN PATENT DOCUMENTS

| CA | 2748171 A1 | 7/2010 |
| CA | 2822480 A1 | 6/2012 |

(Continued)

OTHER PUBLICATIONS

International Search Report and Written Opinion of Application No. PCT/CA2017/050838 (dated Oct. 2, 2017).

*Primary Examiner* — Frantz F Jules
*Assistant Examiner* — Schyler S Sanks
(74) *Attorney, Agent, or Firm* — Ridout & Maybee LLP

(57) ABSTRACT

A heat exchanger apparatus having a first fluid channel, a second fluid channel, a bypass channel, and inlet and outlet manifolds. A thermal bypass valve assembly is positioned within the inlet manifold, and contains an outer sleeve having a first, second and third apertures axially displaced. An inner sleeve positioned within the outer sleeve and moveable from a first to a second position upon actuation of a first actuator. The inner sleeve has a first orifice on a wall of the inner sleeve and a second orifice defined by the inner sleeve second end. The first orifice aligns with the first aperture in the first position and the second aperture in the in the second position. A second actuator coupled to a stopper that engagingly disengages from the second orifice upon actuation of the second actuator.

20 Claims, 18 Drawing Sheets

(51) Int. Cl.
*F28D 9/00* (2006.01)
*F01M 5/00* (2006.01)
*F16K 31/00* (2006.01)
*F28D 21/00* (2006.01)

(52) U.S. Cl.
CPC ............ *F16K 31/002* (2013.01); *F28D 9/005* (2013.01); *F28D 2021/0089* (2013.01); *F28F 2250/06* (2013.01)

(58) Field of Classification Search
CPC . G05D 23/021; G05D 23/022; G05D 23/1366
See application file for complete search history.

(56) References Cited

U.S. PATENT DOCUMENTS

| | | | |
|---|---|---|---|
| 6,550,249 B2 | 4/2003 | Ponca et al. | |
| 7,051,799 B2 | 5/2006 | Wu et al. | |
| 8,596,339 B2 | 12/2013 | Palanchon | |
| 2002/0074419 A1* | 6/2002 | Duffer | B01D 35/147 236/99 K |
| 2010/0018676 A1 | 1/2010 | Yang et al. | |
| 2013/0160972 A1 | 6/2013 | Sheppard et al. | |
| 2013/0319634 A1* | 12/2013 | Sheppard | F28F 27/00 165/96 |
| 2015/0034285 A1 | 2/2015 | Graham | |
| 2015/0316331 A1* | 11/2015 | Kim et al. | F28F 3/044 165/81 |

FOREIGN PATENT DOCUMENTS

| | | |
|---|---|---|
| CA | 2873462 A1 | 12/2013 |
| CA | 2928788 A1 | 6/2015 |
| DE | 10346195 A1 * | 5/2005 |
| EP | 0829795 A2 * | 3/1998 |

* cited by examiner

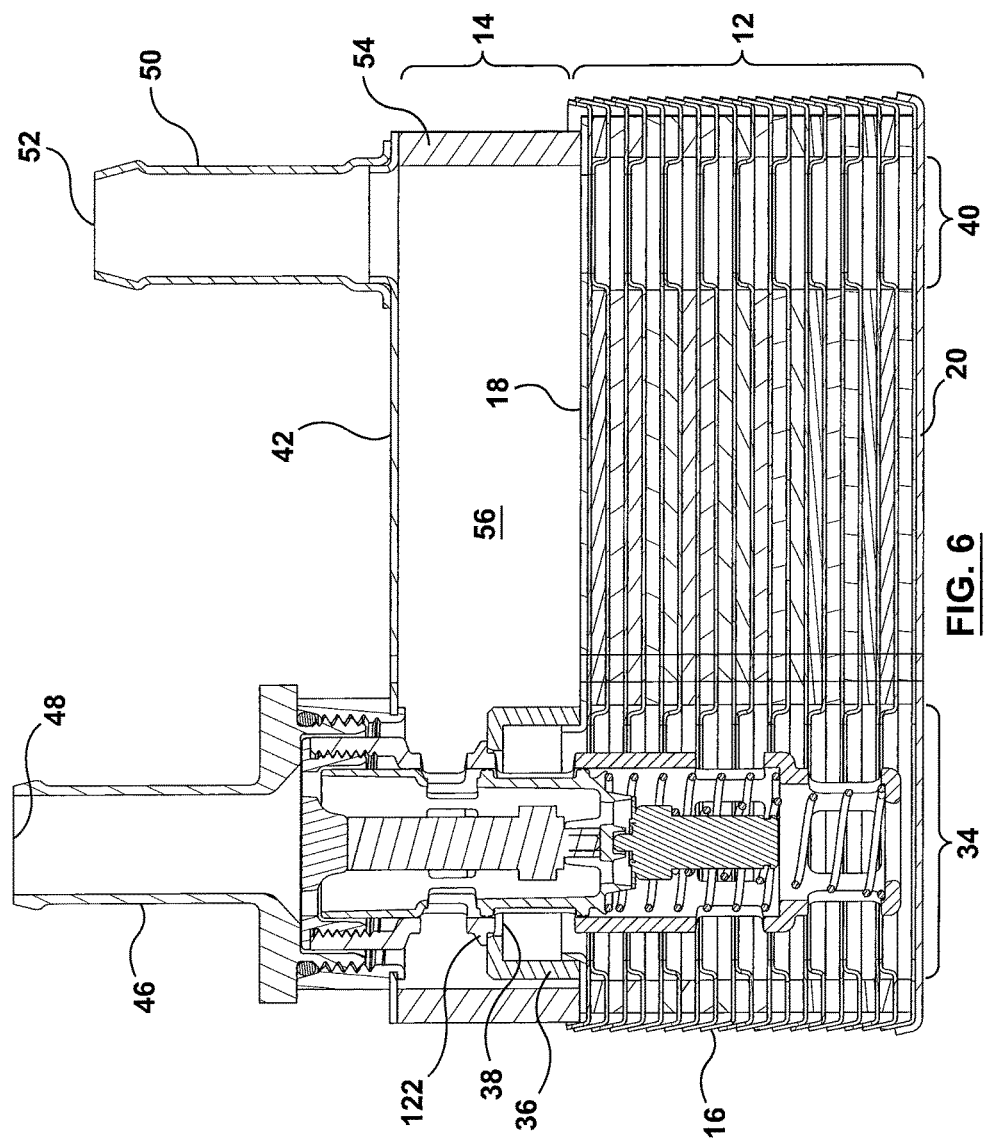

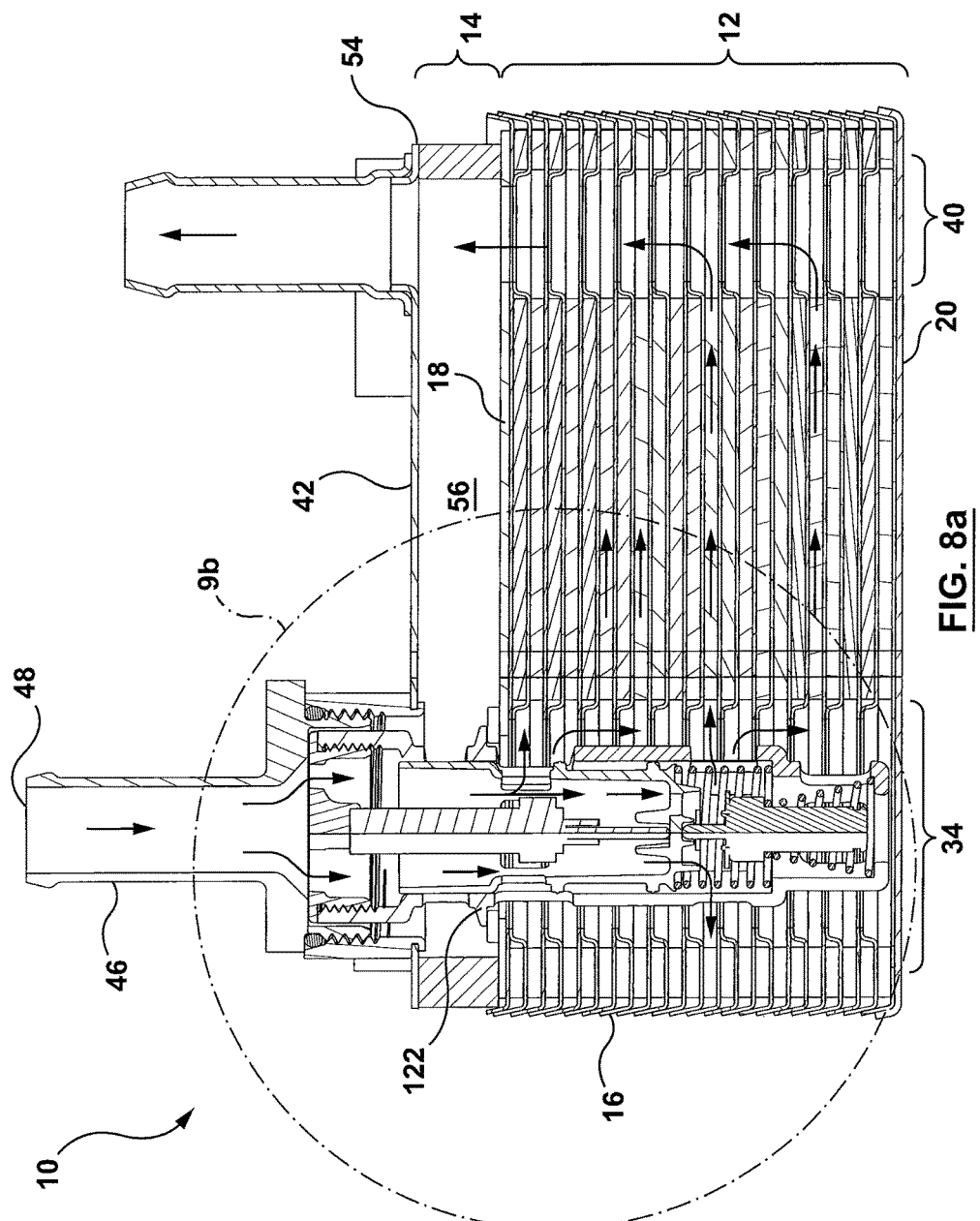

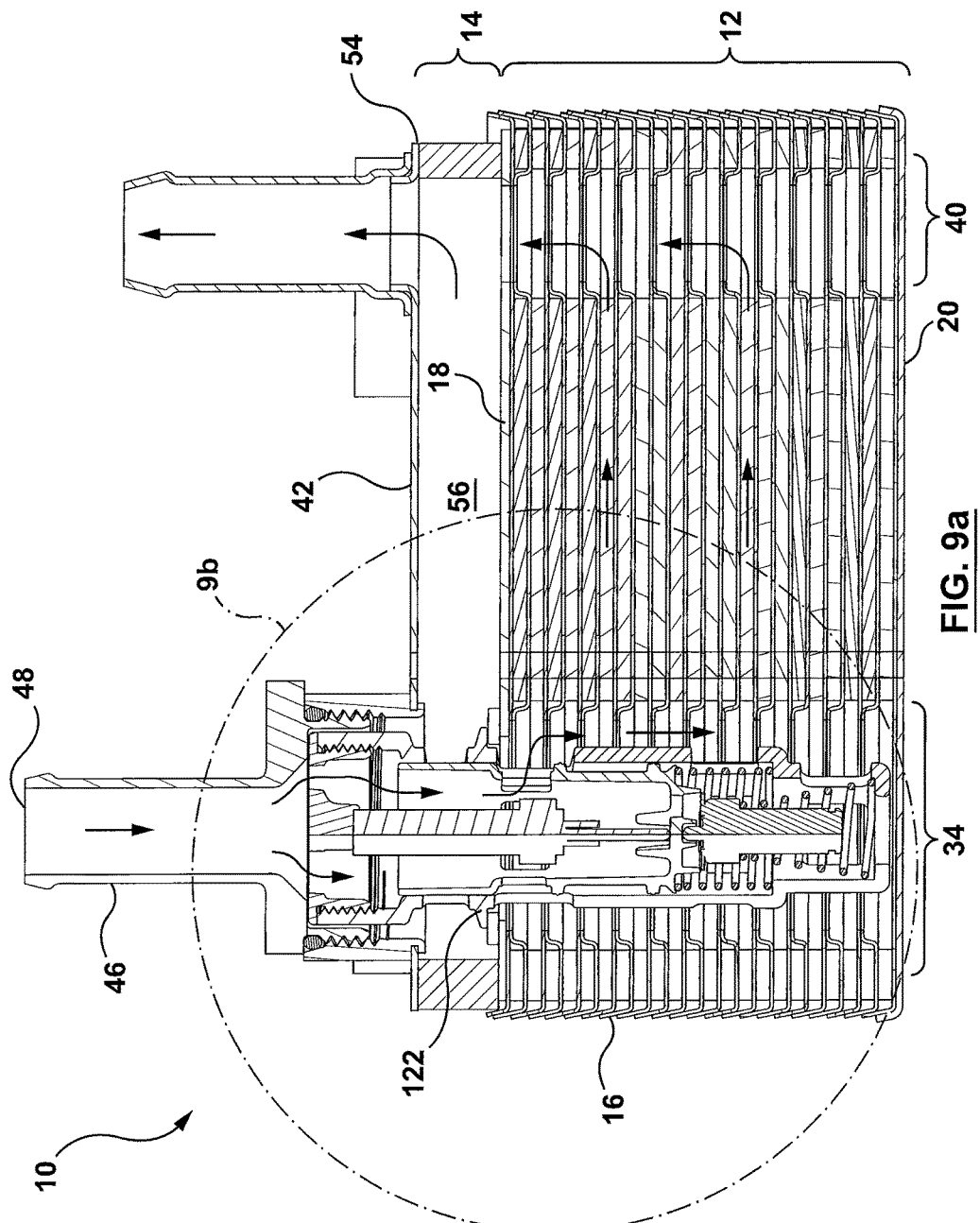

HEAT EXCHANGER WITH DUAL INTERNAL VALVE

FIELD

The specification relates to a heat exchanger apparatus having an integrated dual internal valve.

BACKGROUND

Heat exchanger systems that vary the path of fluid flowing through the heat exchanger in response to a change in the characteristics (e.g. temperature, pressure, etc.) of the fluid are known. For example, WO 94/29659 shows a plate-type oil cooler which has a pressure-responsive valve assembly connected to the inlet of the oil-side to permit the oil to bypass the oil-side of the cooler when the pressure on the oil-side of the cooler exceeds a predetermined value. Alternatively, U.S. Pat. No. 4,669,532 discloses a bimetallic valve which is disposed in the oil-side of an oil-cooler to permit the oil to bypass the oil-side of the cooler when the temperature of the oil is below a predetermined value.

Additionally, there are numerous examples of heat exchanger systems wherein the flow rate of a fluid flowing through a heat exchanger is controlled according to the temperature of that of another fluid flowing through the heat exchanger. For example, German Laid-Open Application No. 196 37 818 and European Laid-Open Application No. 787 929 show two such systems wherein the flow of coolant through an oil cooler is controlled in response to the temperature of the oil flowing through the heat exchanger. In both of the systems, a thermostat is located upstream of the inlet to measure the oil temperature before the oil enters the heat exchanger, although it is also known to control the flow of coolant through the heat exchanger system in response to the oil temperature as it exits the heat exchanger.

The problem with these systems is that they may take up considerable amounts of space, which is always at a premium in automotive applications, a primary use of this art. Additionally, these systems may add weight to the vehicle to which they are attached, possibly degrading fuel economy thereby. Furthermore, the environment surrounding the thermostat in these systems may affect the oil temperature reading, causing more or less coolant to be directed to the heat exchanger than is actually necessary.

US Patent Publication No. 2013/0160972 A1, incorporated herein by reference, discloses a heat exchanger apparatus containing a heat exchanger and a thermally actuated bypass valve. The valve helps to control fluid flow through a bypass channel or the heat exchanger depending upon the temperature of the fluid.

There is still a need in the art for a heat exchanger apparatus that can help control fluid flow through a bypass channel or the heat exchanger depending on the temperature of the first and/or second fluid flowing through the heat exchanger.

BRIEF DESCRIPTION OF THE DRAWINGS

Reference will now be made, by way of example, to the accompanying drawings which show example embodiments of the present application, and in which:

FIG. 6 shows a sectional view along the lines A-A in FIG. 3 of a second embodiment of a heat exchanger apparatus;

Similar reference numerals may have been used in different figures to denote similar components.

SUMMARY OF INVENTION

Figure 1:
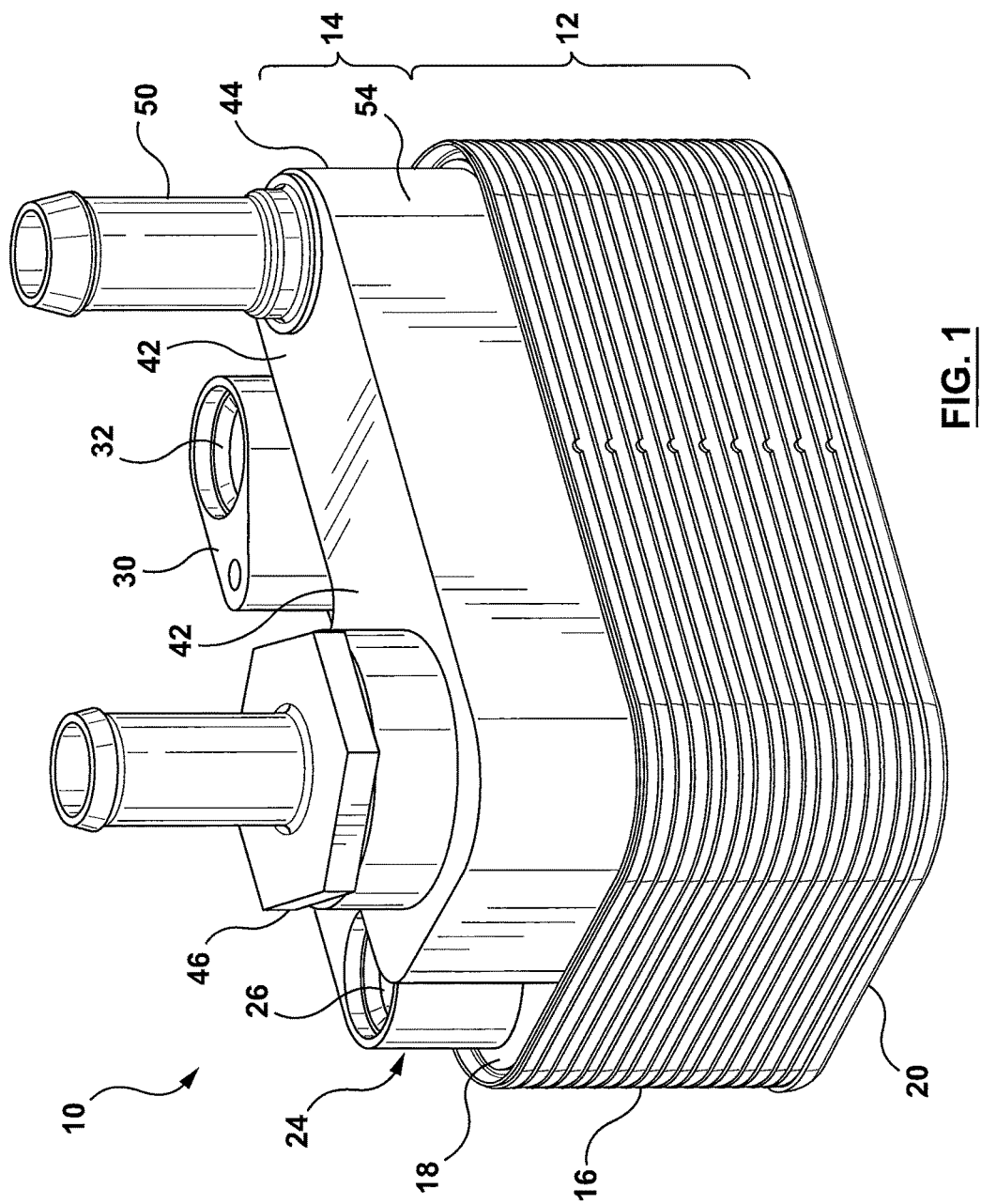
FIG. 1 discloses an embodiment of a heat exchanger apparatus in accordance with the embodiment disclosed herein.

In one aspect, the specification discloses a heat exchanger apparatus, containing:

a heat exchanger section containing:

a top end heat exchanger plate, a bottom end heat exchanger plate and a plurality of heat exchanger plates positioned between the top end heat exchanger plate and the bottom end heat exchanger plate, the plurality of heat exchange plates defining a first fluid channel and a second fluid channel;

a first fluid inlet manifold having a first fluid inlet, a first fluid outlet manifold having a first fluid outlet, the first fluid channel in fluid communication with the first fluid inlet manifold and the first fluid outlet manifold;

a second fluid inlet manifold having a second fluid inlet, a second fluid outlet manifold having a second fluid outlet, the second fluid channel in fluid communication with the second fluid inlet manifold and the second fluid outlet manifold;

a bypass section coupled to the heat exchanger section, the bypass section containing:

a bypass channel cover plate coupled to the top end heat exchanger plate, the bypass channel cover plate together with the top end heat exchanger plate defining a bypass channel with the bypass channel being in fluid communication with the second fluid inlet manifold and the second fluid outlet manifold; and a thermal bypass valve assembly positioned within the second fluid inlet manifold, the thermal bypass valve assembly containing:

a hollow outer sleeve having an inner wall, an outer wall, a first open end, a second end, a first aperture proximate to the first open end, a second aperture and a third aperture proximate the second end, the second aperture axially displaced between the first aperture and the third aperture; the first aperture permitting fluid communication from the second fluid inlet to the bypass channel, and the second aperture and the third aperture permitting fluid communication from the second fluid inlet to the second fluid inlet manifold in the heat exchanger section;

a hollow inner sleeve positioned within the outer sleeve and moveable from a first position to a second position, the hollow inner sleeve having an inner sleeve inner wall, an inner sleeve outer wall in contact with the inner wall of the hollow outer sleeve, an inner sleeve first open end, an inner sleeve second end, a valve seat positioned at the inner sleeve second end, a first orifice, and a second orifice defined by the inner sleeve second end; the first orifice aligning with the first aperture permitting fluid communication from the second fluid inlet to the bypass channel in the first position and the first orifice aligning with the second aperture permitting fluid communication from the second fluid inlet to the second fluid inlet manifold in the heat exchanger section in the second position;

a valve assembly cap coupled at the first open end of the hollow outer sleeve, the valve assembly cap having a valve base and a hole for permitting fluid flow from the second fluid inlet to the hollow portion of the inner sleeve;

a first thermal actuator coupled to the valve base and engaging an inner surface of the hollow inner sleeve at the second end; the first thermal actuator actuating movement of the hollow inner sleeve from the first position to the second position;

a second thermal actuator positioned proximate to the second end of the hollow outer sleeve and engaging an outer surface of the hollow inner sleeve at the second end; and a stopper coupled to the second thermal actuator and moveable from a stopper first position to a stopper second position upon actuation of the second thermal actuator;

wherein the stopper engages the valve seat in the stopper first position to inhibit fluid flow from the second fluid inlet through the second orifice, and the stopper disengages from the valve seat in the stopper second position to permit fluid flow from the second fluid inlet through the second orifice.

In a second aspect, the specification relates to a thermal bypass valve assembly containing:

a hollow outer sleeve having an inner wall, an outer wall, a first open end, a second end, a first aperture proximate to the first open end, a second aperture and a third aperture proximate the second end, the second aperture axially displaced between the first aperture and the third aperture;

a hollow inner sleeve positioned within the outer sleeve and moveable from a first position to a second position, the hollow inner sleeve having an inner sleeve inner wall, an inner sleeve outer wall in contact with the inner wall of the hollow outer sleeve, an inner sleeve first open end, an inner sleeve second end, a valve seat positioned at the inner sleeve second end, a first orifice, and a second orifice defined by the inner sleeve second end; the first orifice aligning with the first aperture in the first position and the first orifice aligning with the second aperture in the second position;

a valve assembly cap coupled at the first open end of the hollow outer sleeve, the valve assembly cap having a valve base and a hole for permitting fluid flow to the hollow portion of the inner sleeve;

a first thermal actuator coupled to the valve base and engaging an inner surface of the hollow inner sleeve at the second end; the first thermal actuator actuating movement of the hollow inner sleeve from the first position to the second position;

a second thermal actuator positioned proximate to the second end of the hollow outer sleeve and engaging an outer surface of the hollow inner sleeve at the second end; and a stopper coupled to the second thermal actuator and moveable from a stopper first position to a stopper second position upon actuation of the second thermal actuator;

wherein the stopper engages the valve seat in the stopper first position to inhibit fluid flow through the second orifice, and the stopper disengages from the valve seat in the stopper second position to permit fluid flow through the second orifice.

In a third aspect, the specification relates to a heat exchanger apparatus containing:

a first fluid channel, a second fluid channel, a bypass channel, and inlet and outlet manifolds;

a thermal bypass valve assembly positioned within the inlet manifold, the thermal bypass valve containing an outer sleeve having a first aperture, a second aperture and a third aperture axially displaced;

an inner sleeve positioned within the outer sleeve and moveable from a first position to a second position upon actuation of a first thermal actuator; the inner sleeve defining a first orifice on a wall of the inner sleeve and a second orifice defined by an inner sleeve second end; wherein the first orifice aligns with the first aperture in the first position and the second aperture in the in the second position;

a second thermal actuator coupled to a stopper that engagingly disengages from the second orifice upon actuation of the second actuator.

DESCRIPTION OF EXAMPLE EMBODIMENTS

FIG. 1 discloses an embodiment of a heat exchanger apparatus 10 in accordance with an embodiment disclosed herein. The heat exchanger apparatus 10 is provided with a heat exchanger section 12 and a bypass channel section 14 coupled to the heat exchanger section 12. Although in the embodiment disclosed herein, the bypass channel section 14 is positioned at a top end of the heat exchanger apparatus 10, above the heat exchanger section 12, variations can be made depending upon the design and application requirements, such as the bypass section 14 being below the heat exchanger section 12. In addition, the bypass channel section 14 may be separated from the heat exchanger section 12, rather than being attached as shown in FIG. 1.

The heat exchanger section 12 is formed by a plurality of heat exchanger plates 16 which together define channels for separate flow of a first fluid and a second fluid (as disclosed further herein). The channels formed by the plurality of heat exchanger plates 16 permit heat exchange between the first fluid and the second fluid flowing in the channels. The heat exchanger section 12 is also provided with a top end heat exchanger plate 18 and a bottom end heat exchanger 20, with the plurality of heat exchanger plates 16 sandwiched between the top end heat exchanger plate 18 and the bottom end heat exchanger 20. The top end heat exchanger plate 18 and the bottom end heat exchanger 20 can be formed of the same plates as the plurality of heat exchanger plates 16, or may be different, for instance, to provide structural integrity, depending upon the design and application requirements.

As in typical heat exchangers, the heat exchanger apparatus 10 is provided with a first fluid inlet manifold (not shown) and a first fluid inlet fitting 24 having a first fluid inlet 26. Also, provided is a first fluid outlet manifold (not shown) and a first fluid outlet fitting 30 having a first fluid outlet 32. During operation, a first fluid enters the heat exchanger apparatus 10 from the first fluid inlet 26 in the first fluid inlet fitting 26, which is connected to the top end heat exchanger plate 18 of the heat exchanger apparatus 10, and allows the first fluid to flow into the first fluid inlet manifold. From the first fluid inlet manifold, the first fluid enters first fluid channels defined by the plurality of heat exchanger plates 16, and exits into a first fluid outlet manifold. The first fluid then exits from the heat exchanger apparatus 10 by flowing through the first fluid outlet 32 in the first fluid outlet fitting 30, which is connected to the top end heat exchanger plate 18 (similar to the first fluid inlet fitting 24). In one embodiment, for example and without limitation, as disclosed herein the first fluid is engine oil.

The bypass section 14 of the heat exchanger apparatus 10 disclosed herein can be formed a bypass channel housing 54 that allows a second fluid to flow therethrough. In the embodiment shown, the bypass channel housing 54 is provided with bypass channel vertical side walls 44 coupled to a bypass channel cover plate 42, which together with the top end heat exchanger plate 18 provide a bypass channel 56. Alternatively, the bypass section 14 can also be formed using a bypass channel cover plate 42, analogous to that shown in US Patent Publication No. 2013/0160972 A1, incorporated herein by reference.

In the embodiment shown, the bypass channel cover plate 42 is coupled to the top end heat exchanger plate 18, but covering only a portion of the top end heat exchanger plate 18. As should be recognized by those skilled in the art, the bypass channel cover plate 42 can be modified such that it covers more or the entire real estate of the top end heat exchanger plate 18, and designed such that it allows only the second fluid to enter the bypass channel 56 or the second fluid inlet manifold 34.

For flow of the second fluid, the heat exchanger apparatus 10 is provided with a second fluid inlet fitting 46 having a second fluid inlet 48, and a second fluid outlet fitting 50 having a second fluid outlet 52. Also provided is a second fluid inlet manifold 34, which extends from the bypass channel section 14 to the heat exchanger section 12, and is in fluid communication with the bypass channel 56 and the second fluid channels 60 formed by the plurality of heat exchanger plates 16. A second fluid entering the second fluid inlet manifold 34 from the second fluid inlet 48 in the second fluid inlet fitting 46 can flow through the bypass channel 56 or the second fluid channels 60 to the second fluid outlet manifold 40. The second fluid exits from the second fluid outlet manifold 40 and exits the heat exchanger apparatus from the second fluid outlet 52 in the second fluid outlet fitting 50. Details of flow control of the second fluid being directed to the bypass channel 56, the second fluid channels 60 or both, are described herein below. In one embodiment, for example and without limitation, as disclosed herein the second fluid is engine oil coolant.

Figure 2:
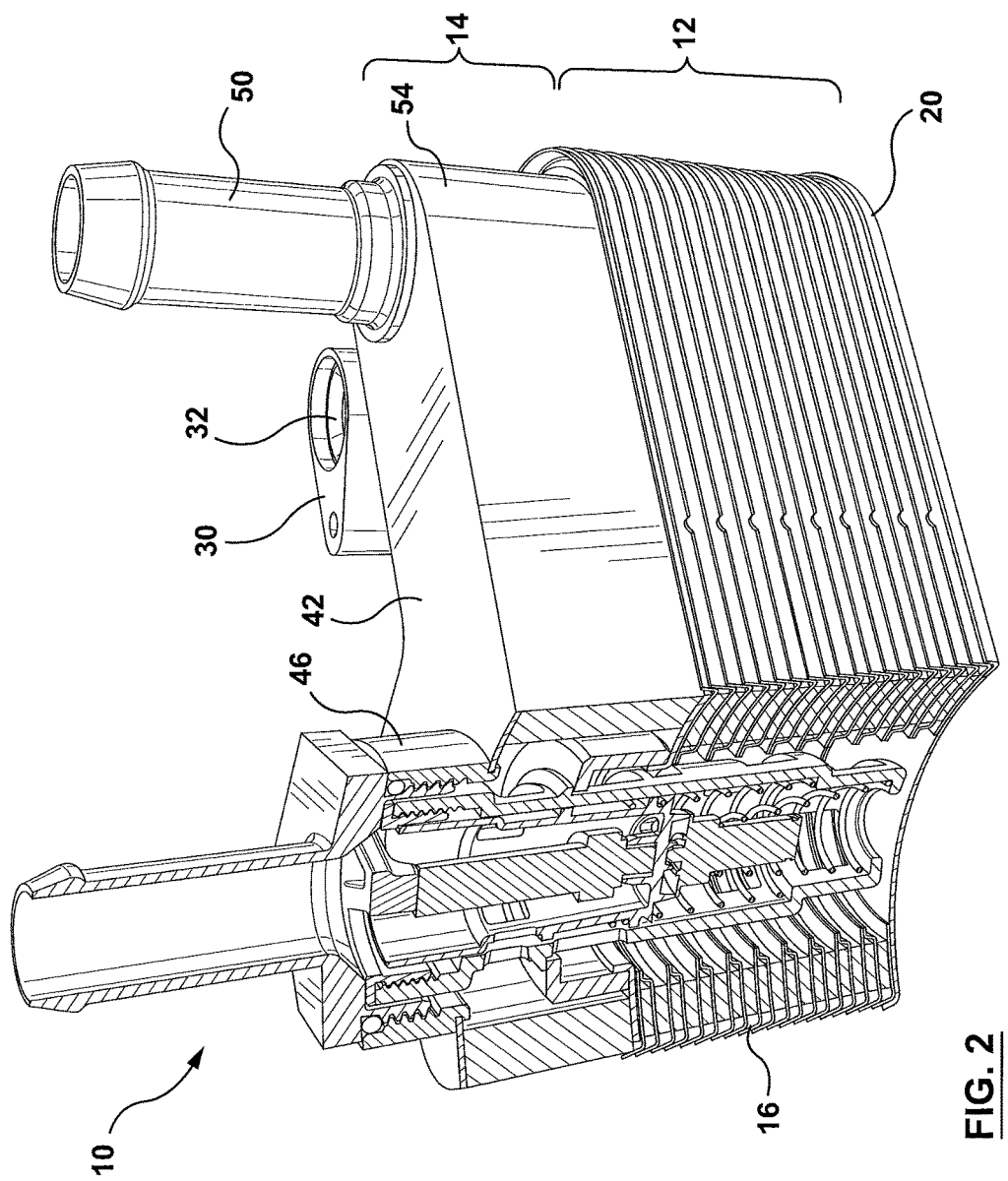
FIG. 2 discloses a partial sectional view of the heat exchanger apparatus shown in FIG. 1.

FIG. 2 shows a partial sectional view of the heat exchanger apparatus 10 showing a sectional view of the thermal bypass valve assembly 60 that can help to control flow of the second fluid to the bypass channel 56, the second fluid channels 60 or both.

Figure 3:
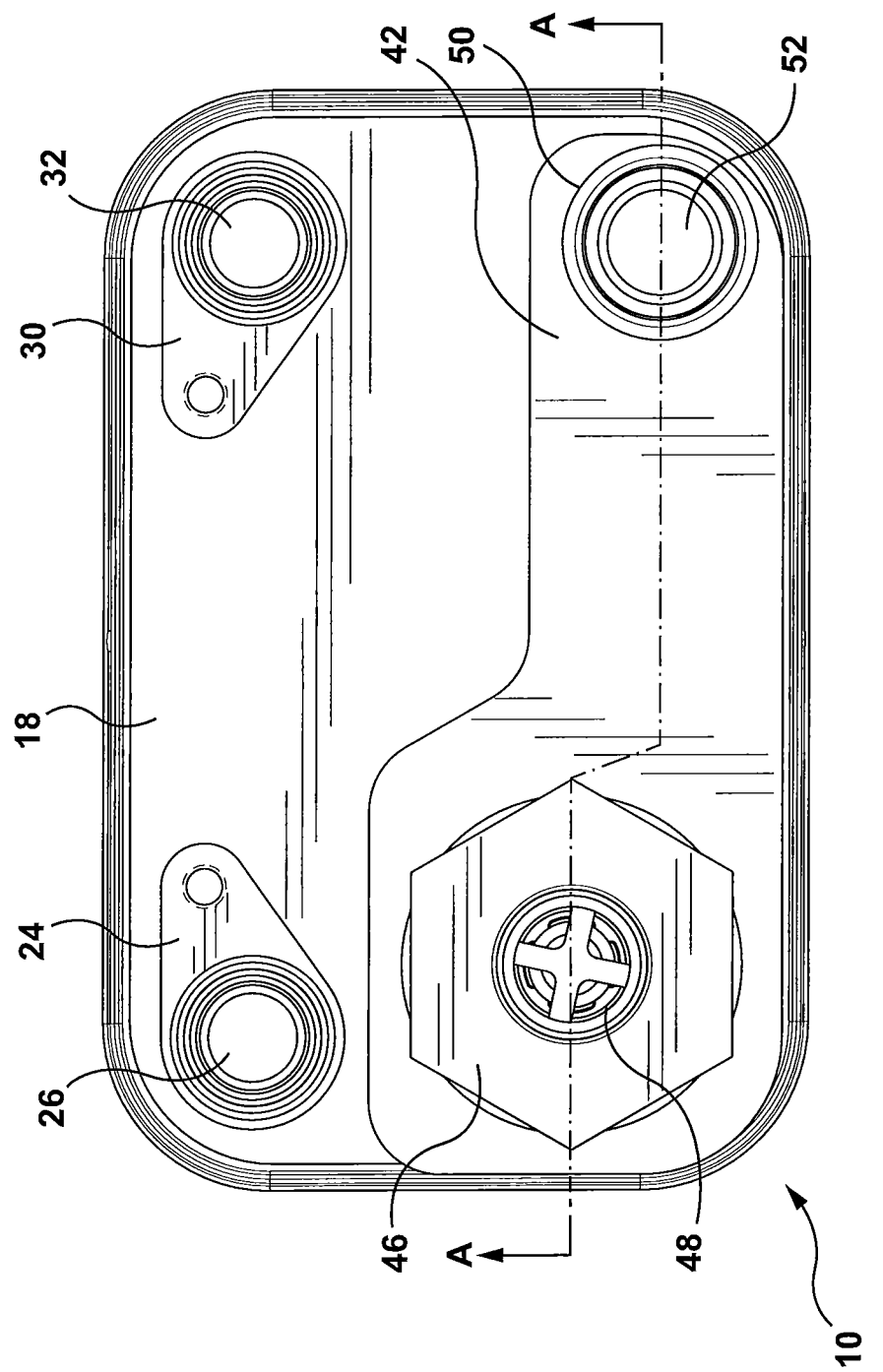
FIG. 3 shows a top plan view of the heat exchanger apparatus shown in FIG. 1.

FIG. 3 shows a top plan view of the heat exchanger apparatus 10 in accordance with an embodiment disclosed herein. The top end heat exchanger plate 18 is shown along with the real estate covered by bypass channel cover plate 42. Although the first fluid inlet fitting 24 having the first fluid inlet 26 is shown on the same side as the second fluid inlet 46 having the second fluid inlet 48, as should be recognized by a person of ordinary skill in the art, the heat exchanger apparatus 10 can be designed such that the position of the first fluid inlet fitting 24 having the first fluid inlet 26 can be switched with the first fluid outlet fitting 30 having the first fluid outlet 23. Moreover, as a thermal bypass valve assembly 62 (discussed further below) is placed in the second fluid inlet manifold 34, the size of the second fluid inlet fitting 46 having the second fluid inlet 48 can be larger than the second fluid outlet fitting 50 having the second fluid outlet 52.

Figure 4A:
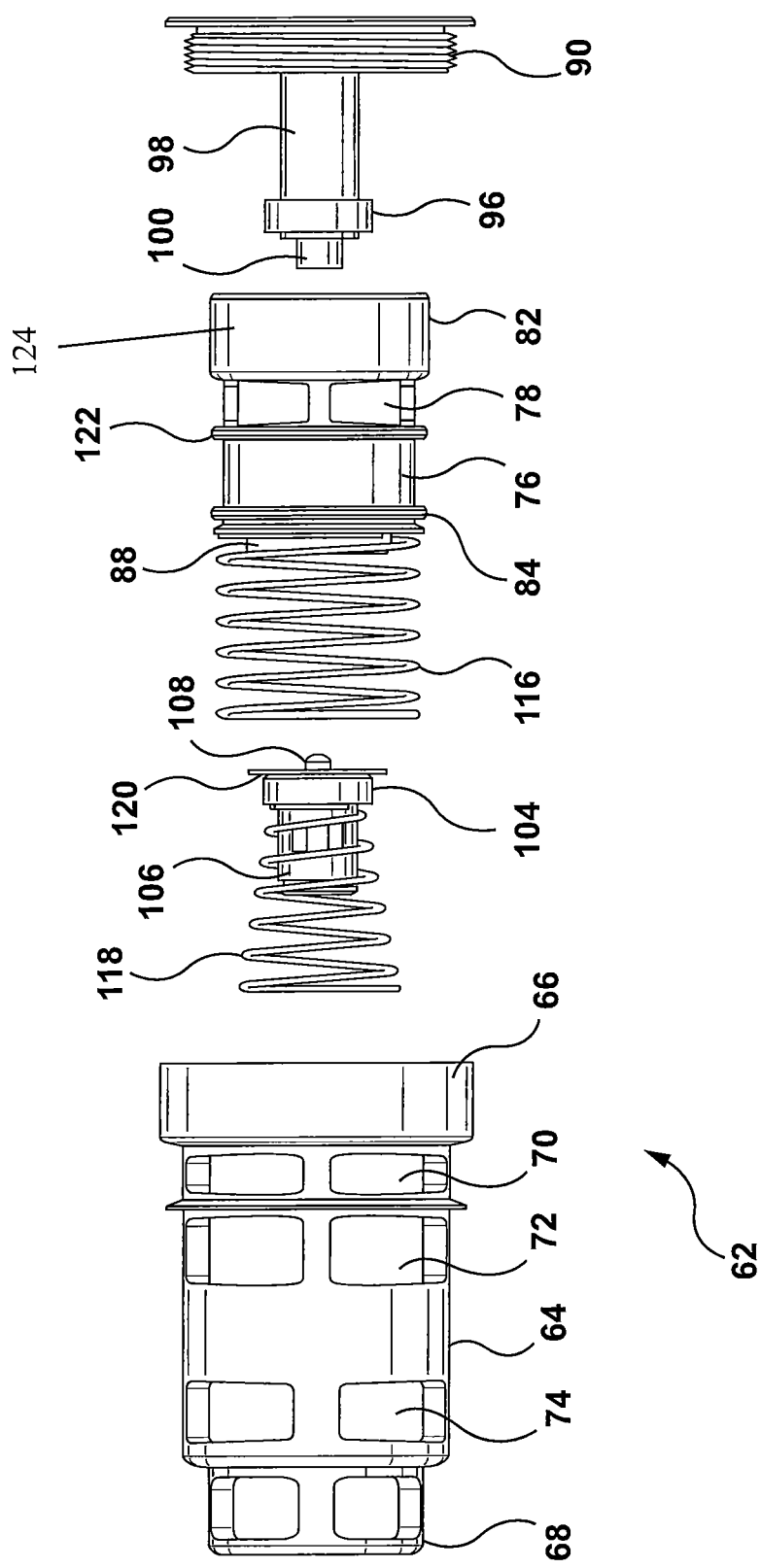
FIG. 4 shows (a) an exploded plan view and (b) exploded perspective view of a thermal bypass valve assembly in accordance with an embodiment disclosed herein.
Figure 4B:
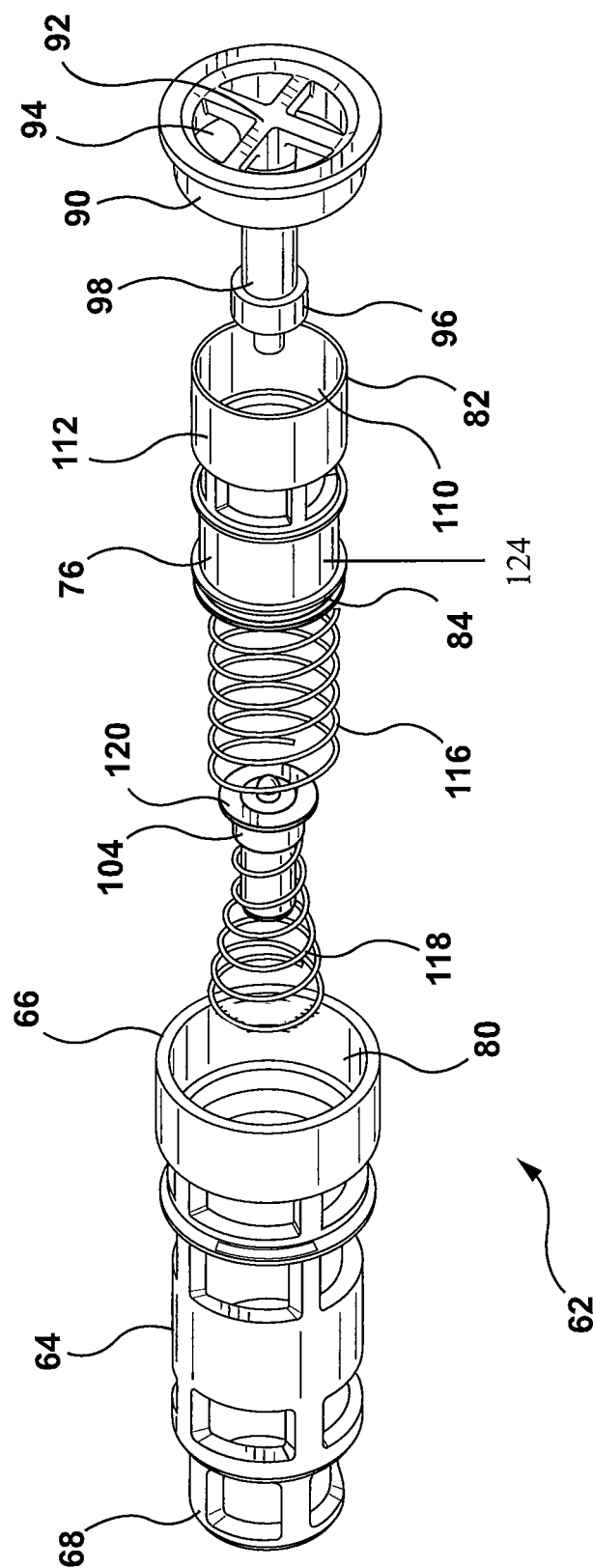

Exploded plan and perspective views of the thermal bypass valve assembly 62 are shown in FIGS. 4a and 4b, respectively. The thermal bypass valve assembly 62 has a hollow outer sleeve 64 having a first end 66 (noted also as 'first end of outer sleeve') and a second end 68 (noted also as 'second end of outer sleeve'). The outer sleeve 64 is provided with a first aperture 70, a second aperture 72 and a third aperture 74, with the first, second and third apertures being axially displaced on the outer sleeve 64. In other words, the first, second and third apertures are positioned along the length of the outer sleeve 64, with the first aperture 70 being more closer or proximate to the first end of the outer sleeve 66, the third aperture 74 being more closer or proximate to the second end of the outer sleeve 68, and the second aperture 72 formed between the first aperture 70 and the third aperture 74.

The valve assembly 62 has a hollow inner sleeve 76 that can slide within the outer sleeve 64, with an outer wall 124 of the inner sleeve 76 being in contact with an inner wall of the outer sleeve 80, to prevent fluid flow between outer wall 124 of the inner sleeve 76 and the inner wall of the outer sleeve 80. The inner sleeve 76 has a first orifice 78 between a first end of the inner sleeve 82 and a second end of the inner sleeve 84. The first end of the inner sleeve 82 being closer to the first end of the outer sleeve 66, and the second end of the inner sleeve 84 being closer to the second end of the outer sleeve 68.

As the inner sleeve 76 moves from a first position to a second position, the first orifice 78 permits fluid communication to the first aperture 70 of the outer sleeve 64 in the first position, and the first orifice 78 permits fluid communication to the second aperture 72 of the outer sleeve 64 in the second position (as described further herein below). For the invention disclosed herein, alignment of the first orifice 78 in the inner sleeve 76 with the first aperture 70 or second aperture 72 in the outer sleeve 64, does not require perfect alignment of the edges defining the aperture or orifice, but rather alignment of the aperture and orifice would be considered to have taken place, so long as fluid can flow through the first orifice 78 in the inner sleeve 76 through the first aperture 70 in the outer sleeve 64 in the first position, or second aperture 72 in the outer sleeve 64 in the second position (as described further herein below).

The inner sleeve 76 has a second orifice 86 (shown in FIGS. 5-8) at the second end of the inner sleeve 84. Unlike the first orifice 78 which is present on the cylindrical portion of the inner sleeve 76, the second orifice 86 is present at the bottom of the inner sleeve and can allow fluid to flow through the hollow inner sleeve 76 to the inner portion of the hollow outer sleeve 64 before the fluid flows into the inlet manifold, as described further below along with some additional features of the valve assembly that can help to control fluid flow.

A valve assembly cap 90 is attached to the outer sleeve 64 at the first end of the outer sleeve 66. The valve assembly cap 90 has a base 92 that has a hole 94 to permit fluid flow through the valve assembly cap 90 to the inner portion of the hollow inner sleeve 76. A first thermal actuator 96 is coupled to the base 92 of the valve assembly cap 90. The first thermal actuator 96 has a first thermal actuator body 98 and a first thermal actuator piston 100 that extends outwardly from the first thermal actuator body 98. In other words, the first thermal actuator piston 100 extends away from and along the length of the first thermal actuator body 98. Upon assembly, the first thermal actuator 96 is positioned within the hollow inner sleeve 76. In one embodiment, as disclosed herein, the first thermal actuator piston 100 engages a first thermal actuator piston engaging receptacle 102 on an inner surface at the second end of the inner sleeve 110 to activate movement of the inner sleeve 76 from the first position to the second position.

The thermal bypass valve assembly 62 is also provided with a second thermal actuator 104 having a second thermal actuator body 106 and a second thermal actuator piston 108. The second thermal actuator 104 is positioned within hollow outer sleeve 64 close to the second end 68, and outside the hollow inner sleeve 76. The second thermal actuator piston 108 engages a second thermal actuator piston engaging receptacle 114 on an outer surface at the second end of the inner sleeve 112 (as described further below).

A stopper 120 is coupled to the second thermal actuator 104 and is moveable from a stopper first position to a stopper second position upon actuation of the second thermal actuator (as described herein below). In the embodiment disclosed herein, the stopper 120 takes the shape of a disc having an opening to permit movement of the second thermal actuator piston 108. Moreover, the disc is positioned close to the second thermal actuator piston 108. As described further below, in the first stopper position, the stopper 120 engages a valve seat 88 to inhibit fluid flow through the second orifice 86 in the inner sleeve 76. While in the second stopper position, the stopper 120 disengages from the valve seat 88 to allow fluid to flow through the second orifice 86 in the hollow inner valve 76 towards the second end of the hollow outer sleeve 68.

The thermal bypass valve assembly 62 is provided with a first biasing means 116 and a second biasing means 118. The first biasing means 116 engages the inner sleeve 76 to push the inner sleeve 76 towards the inner sleeve first position. While the second biasing means 118 engages the second thermal actuator 104 to bias movement of the stopper 120 towards the first stopper position to engage the valve seat 88. In the embodiment disclosed herein, the first and second biasing means are springs.

To assemble the thermal bypass valve assembly 62, the second biasing means 118 and the second thermal actuator 104 are slid into the outer sleeve 64, followed by the first biasing means 116 and the inner sleeve 76. The first thermal actuator 96 can then be positioned in the hollow inner sleeve 76 followed by fastening the thermal bypass valve assembly 62 with the valve assembly cap 90.

Figure 5A:
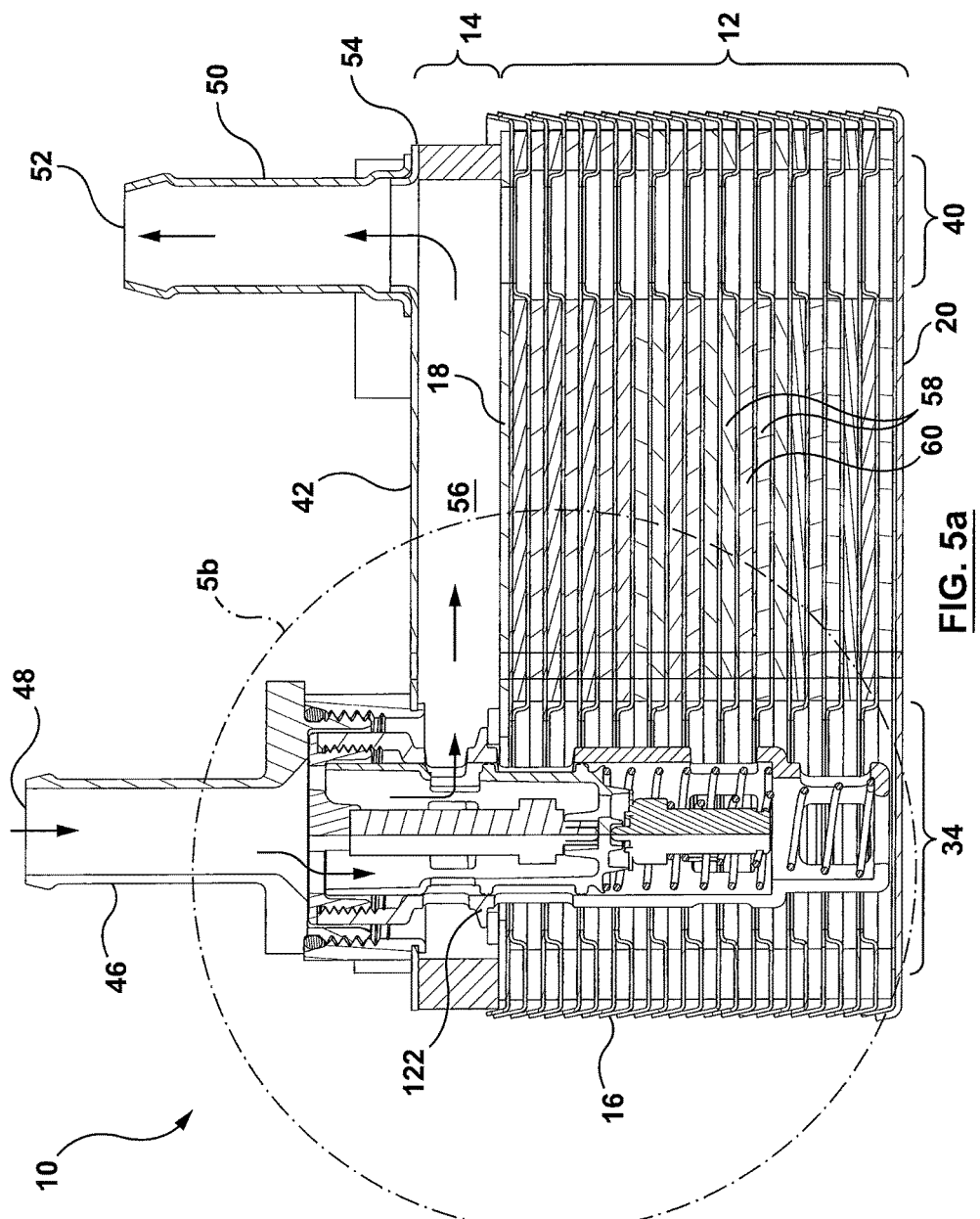
FIG. 5 shows (a) a sectional view of the heat exchanger apparatus along the lines A-A in FIG. 3, (b) an expansion of the heat exchanger apparatus with both the first and second thermal actuators in the first position, and (c) the valve assembly (removed from the heat exchanger apparatus) in the configuration shown in (b)
Figure 5B:
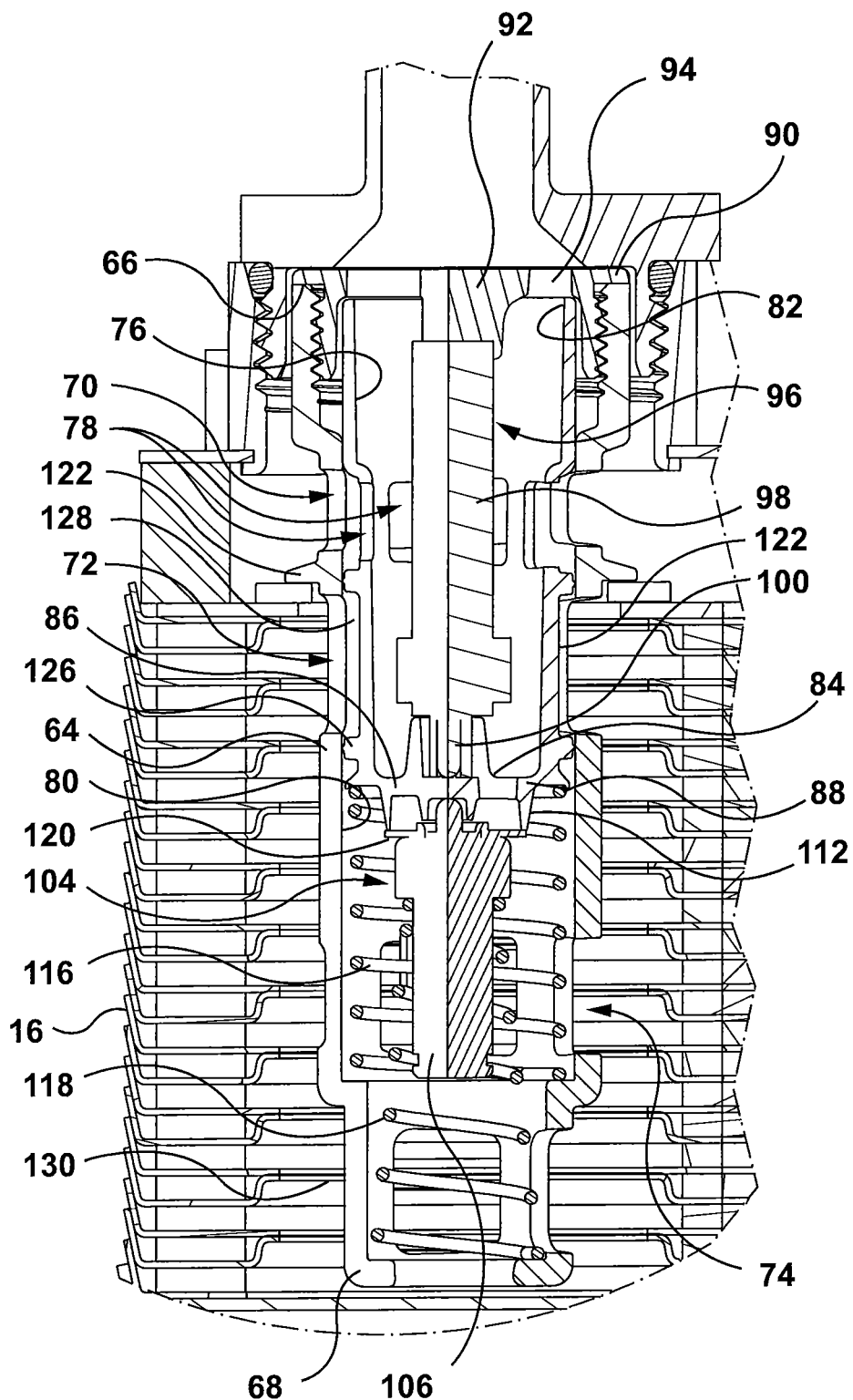

FIG. 5a shows a sectional view of the heat exchanger apparatus 10 along the lines A-A in FIG. 3. FIG. 5b is an expansion of the heat exchanger apparatus 10, encircled by circle "A" in FIG. 5a, with the inner sleeve 76 in the inner sleeve first position and the stopper 120 in the stopper first position. While FIG. 5c shows the valve assembly 62 (removed from the heat exchanger apparatus) in the configuration shown in FIG. 5b.

As described above, the plurality of heat exchanger plates 16 together provide a first fluid channel 58 for flow of a first fluid, and a second fluid channel 60 for flow of a second fluid. The first fluid channels 58 are in fluid communication with the first fluid inlet manifold at one end and the first fluid outlet manifold at a second end, thus allowing fluid to flow from the first fluid inlet manifold to the first fluid outlet manifold. The first fluid channels 58 are thermally coupled to the second fluid channels 60 to allow for heat exchange to take place.

The plurality of heat exchangers plates 16 together also provides a second fluid channel 60 for flow of a second fluid. The second fluid channels 60 are in fluid communication with the second fluid inlet manifold 34 at one end and the second fluid outlet manifold 40 at a second end, thus allowing fluid to flow from the second fluid inlet manifold 34 to the second fluid outlet manifold 40. A second fluid entering from a second fluid inlet 48 in the second fluid inlet fitting 46 flows through the thermal bypass valve assembly 62, which extends from the thermal bypass valve section 14 to the second fluid inlet manifold 34 in the heat exchanger section 14. The second fluid that flows into the second fluid inlet manifold 34 in the heat exchanger section 14 can flow through the second fluid channels 60 to the second fluid outlet manifold 40, and exit from the heat exchanger apparatus 10 from the second fluid outlet 52 in the second fluid outlet fitting 50. The second fluid channels 60 are thermally coupled to the first fluid channels 58 to allow for heat exchange to take place while flowing through the second fluid channels 60.

Figure 5C:
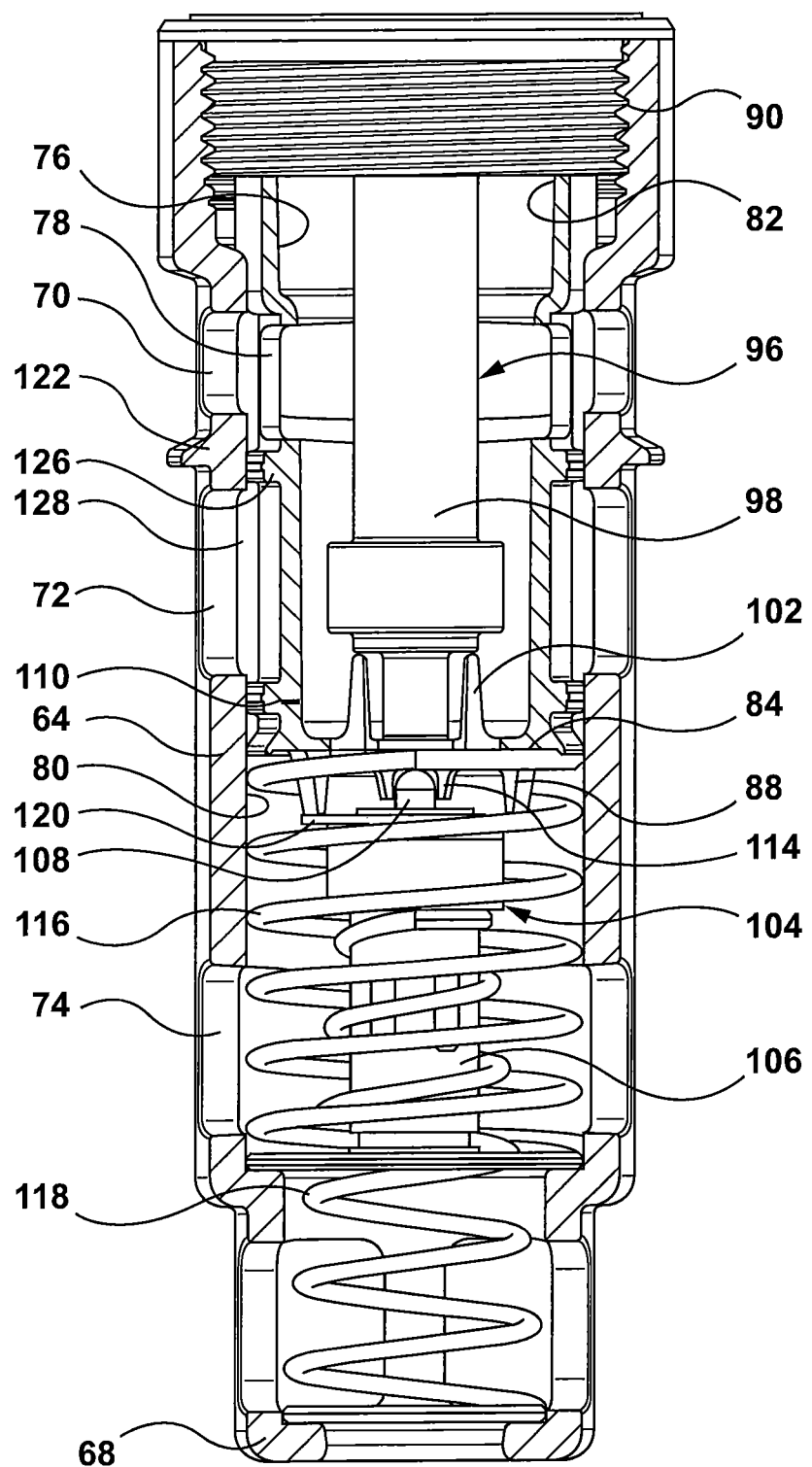

At initial conditions, for instance, when both the first fluid and the second fluid are at cold temperatures, the first thermal actuator 96 and the second thermal actuator 104 both have their pistons in the first contracted position (as shown FIGS. 5b and 5c). Under such a condition, the first fluid (for instance, engine oil) should not require cooling, but rather requires the first fluid to heat up and can flow through the first fluid channels 58, while the second fluid (for instance engine oil coolant) can be directed through the bypass channel 56 to avoid thermally cooling the first fluid in the first fluid channels 58.

With the hollow inner sleeve 76 in the first position, the first orifice 78 aligns with the first aperture 70 in the outer sleeve 64, therefore allowing a second fluid entering from the second fluid inlet 48 to pass through the first aperture 70 in the outer sleeve 64, and enter the bypass channel 56 and exit from the heat exchanger apparatus 10 from the second fluid outlet 52; and hence be redirected to avoid flow through the second fluid channels 60 to avoid cooling the first fluid. Further, flow through the second aperture 72 in the outer sleeve 64 is blocked by the inner sleeve 76, thereby preventing fluid flow in the second inlet manifold 34 in the heat exchanger section 12.

As can be seen in FIGS. 5b and 5c, the first thermal actuator piston 100 (in the contracted state) is positioned to sit in (engages) a first thermal actuator piston engaging receptacle 102 to actuate movement of the inner sleeve 76 from the first position (as shown in FIGS. 5b and 5c) to a second position (as described below). The shape and form of the first thermal actuator piston engaging receptacle 102 is not particularly limited and is positioned on an inner surface at the second end of the inner sleeve 110. In the embodiment disclosed herein, the first thermal actuator piston engaging receptacle is formed by a first projection extending from the inner surface at the second end of the inner sleeve 110 towards the first end of the inner sleeve 82.

As previously described, the outer wall 124 of the inner sleeve 76 is in contact with the inner wall of the outer sleeve 80 to prevent fluid flow between the outer sleeve 64 and the inner sleeve 76. In one embodiment, as shown more clearly in FIGS. 5b and 5c, the outer wall of the inner sleeve 124 has a lip 126 that engages the inner wall of the outer sleeve 80 to block fluid flow in an annulus 128 that can be present between the outer sleeve 64 and the inner sleeve 76. In addition, the inner sleeve 76 has a second orifice 86 at a second end of the inner sleeve 84 to permit fluid flow from the hollow inner sleeve 76 to the hollow portion of the outer sleeve 64 in the heat exchanger section 12, before the second fluid can flow in to the second fluid inlet manifold 34 in the heat exchanger section 12.

A valve seat 88 is also provided on an outer surface at the second end of the inner sleeve 112. Although not particularly limited, as shown in FIGS. 5b and 5c, the valve seat 88 is formed by a protrusion extending from the outer surface at the second end of the inner sleeve 112 towards the second end of the outer sleeve 68. In addition, the outer surface at the second end of the inner sleeve 112 has a second thermal actuator piston engaging receptacle 114 for receiving a second thermal actuator piston 108, as described herein. In one embodiment, as shown herein, the second thermal actuator piston engaging receptacle 114 is formed by a second projection extending from the outer surface at the second end of the inner sleeve 112 towards the second end of the outer sleeve 68. Furthermore, although the first projection 102 for receiving the first thermal actuator piston 100 and the second projection 114 for receiving the second thermal actuator piston 108 are more centrally positioned (proximate to the axis) in the inner sleeve 76, and the valve seat 88 (protrusion) is positioned more closer (distal from the axis of the inner sleeve 76) to the outer wall of the inner sleeve 124 with the second orifice 86 in between the protrusion and projections, the positioning of the projections, protrusion and the second orifice can be varied depending upon the design and application requirements.

In the condition shown in FIGS. 5b and 5c, when the first fluid (engine oil) and the second fluid (engine oil coolant) are both cold, the stopper 120 on the second thermal actuator 104 is in the first stopper position and engages the valve seat 88 to prevent second fluid flow through the second orifice 86 in the inner sleeve 76, thereby inhibiting the second fluid flow to enter the hollow portion of the outer sleeve 64 in the heat exchanger section 12 and then flowing into the second fluid inlet manifold 34 and second fluid channels 60. As the inner sleeve 76 also blocks off the second aperture 72 in the outer sleeve 64, second fluid flow in the second fluid inlet manifold 34 in the heat exchanger section 12 is blocked, thereby directing the second fluid flow in the bypass channel 56.

As shown in FIGS. 5b and 5c, the outer sleeve 64 of the thermal bypass valve assembly 62 can contact edges 130 of the plurality of heat exchanger plates 16 that together help define the second fluid inlet manifold 34, and be coupled to them so that the outer sleeve 64 is fixed in place. Alternatively, the bypass valve assembly 62 can be designed such that the outer sleeve 64 avoids contact with the edges of the plurality of heat exchanger plates 130. In one embodiment, for example and without limitation, the outer sleeve 64 can run the length of the heat exchanger apparatus, i.e., from the second fluid inlet fitting 46 to the bottom end heat exchanger plate 20. Alternatively, as shown in FIGS. 5b and 5c, the second end of the outer sleeve 68 is positioned to avoid contact with the bottom end heat exchanger plate 20 to allow for thermal expansion/contraction. In such an embodiment, the outer sleeve 64 can still be coupled to the edges of the plurality of heat exchanger plates 130 to affix the outer sleeve 64 in position. Alternatively, or in addition, the outer sleeve 64 can be provided with a shoulder 122 that contacts or is coupled to the top end heat exchanger plate 18 (as shown in FIGS. 5b and 5c) or positioned on or coupled to a bracket 36 (FIG. 6) to fluidly seal the heat exchanger section 12 from the bypass channel section 14. The shoulder 122 can help to design an outer sleeve 64 that avoids contact with the edges of the plurality of heat exchanger plates 130, while helping to affix the outer sleeve 64 in position. The method and manner of coupling the shoulder 122 to the top end heat exchanger plate 18 (FIGS. 5b and 5c) or the bracket 36 (FIG. 6) is not particularly limited and can be varied depending upon the design and application requirements. In one embodiment, as shown in FIGS. 5b, 5c and 6, a spacing 38 between the top end heat exchanger plate 18 (FIGS. 5b and 5c) or the bracket 36 (FIG. 6), while the shoulder 122 sits on the top end heat exchanger plate 18 (FIGS. 5b and 5c) or the bracket 36 (FIG. 6) to prevent second fluid flow from the bypass section 14 to the heat exchanger section 12 outside the outer sleeve 64.

Figure 7A:
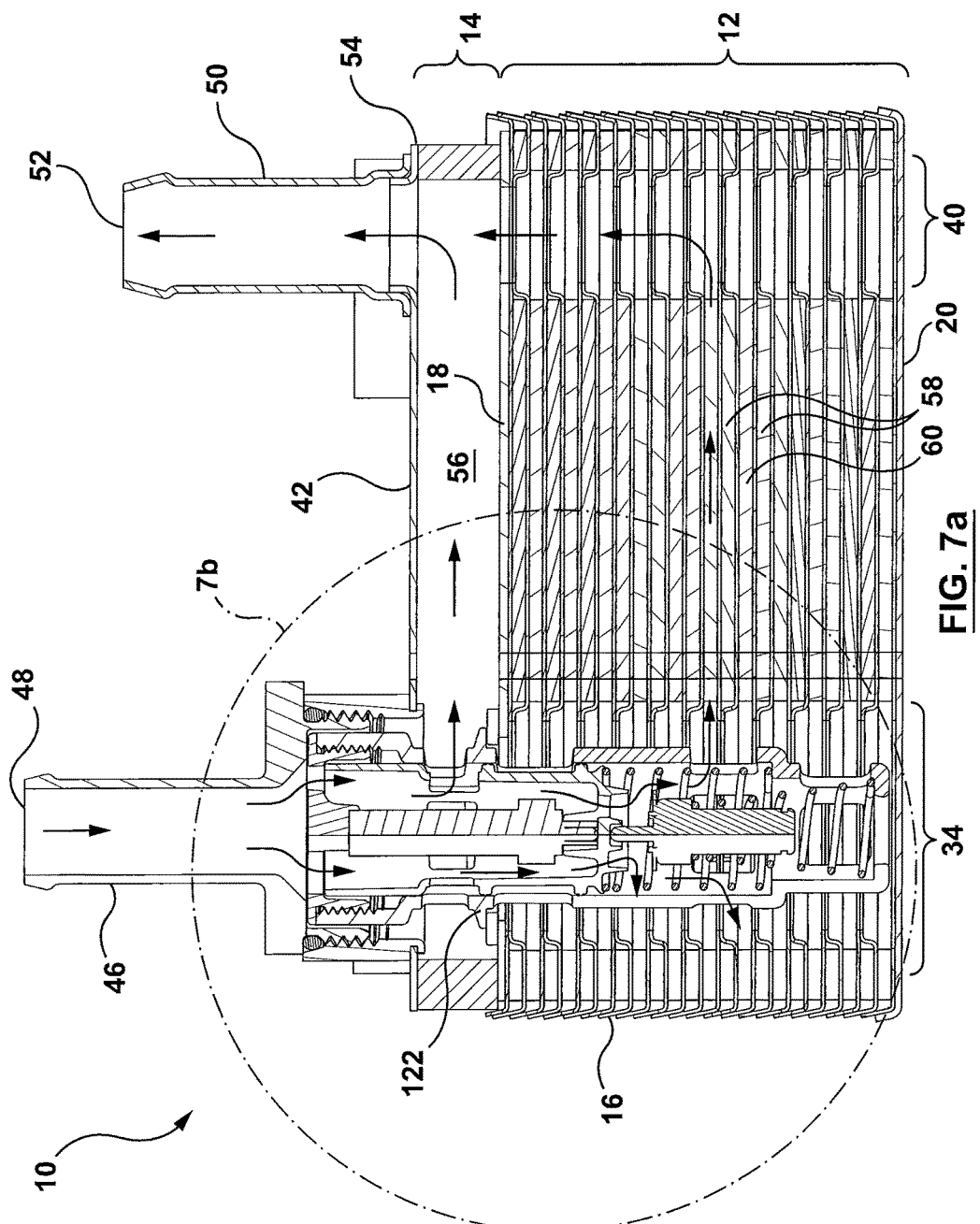
FIG. 7 shows (a) a sectional view of the heat exchanger apparatus along the lines A-A in FIG. 3, (b) an expansion of the heat exchanger apparatus with both the first thermal actuator in the second position and the second thermal actuator in the first position, and (c) the valve assembly (removed from the heat exchanger apparatus) in the configuration shown in (b)
Figure 7B:
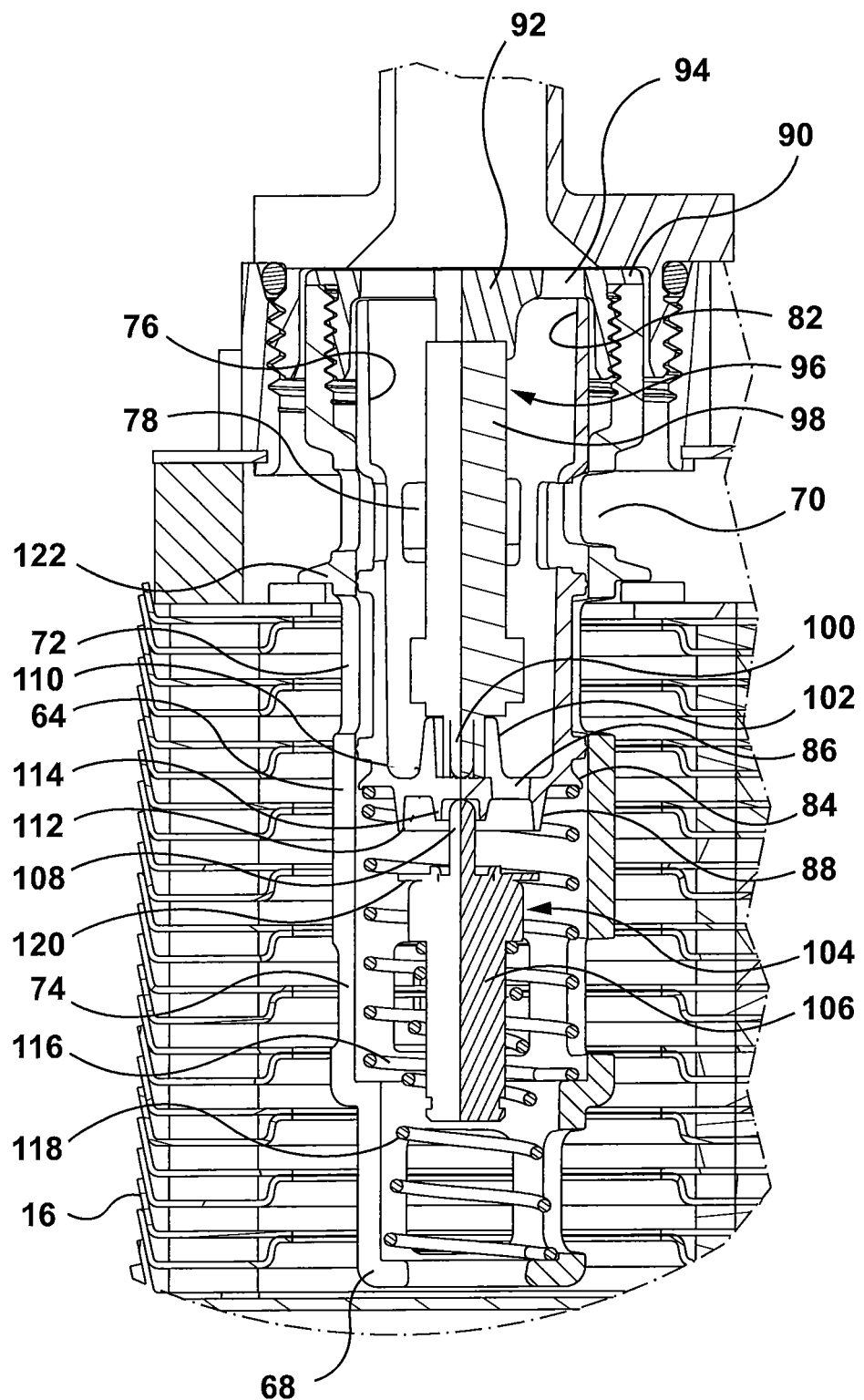

FIG. 7a shows a sectional view of the heat exchanger apparatus 10 along the lines A-A in FIG. 3. FIG. 7b is an expansion of the heat exchanger apparatus 10, encircled by circle "A" in FIG. 7a, with the first thermal actuator 96 in the second position and the second thermal actuator 104 in the first position. While FIG. 7c shows the valve assembly 62 (removed from the heat exchanger apparatus) in the configuration shown in FIG. 7b.

Figure 7C:
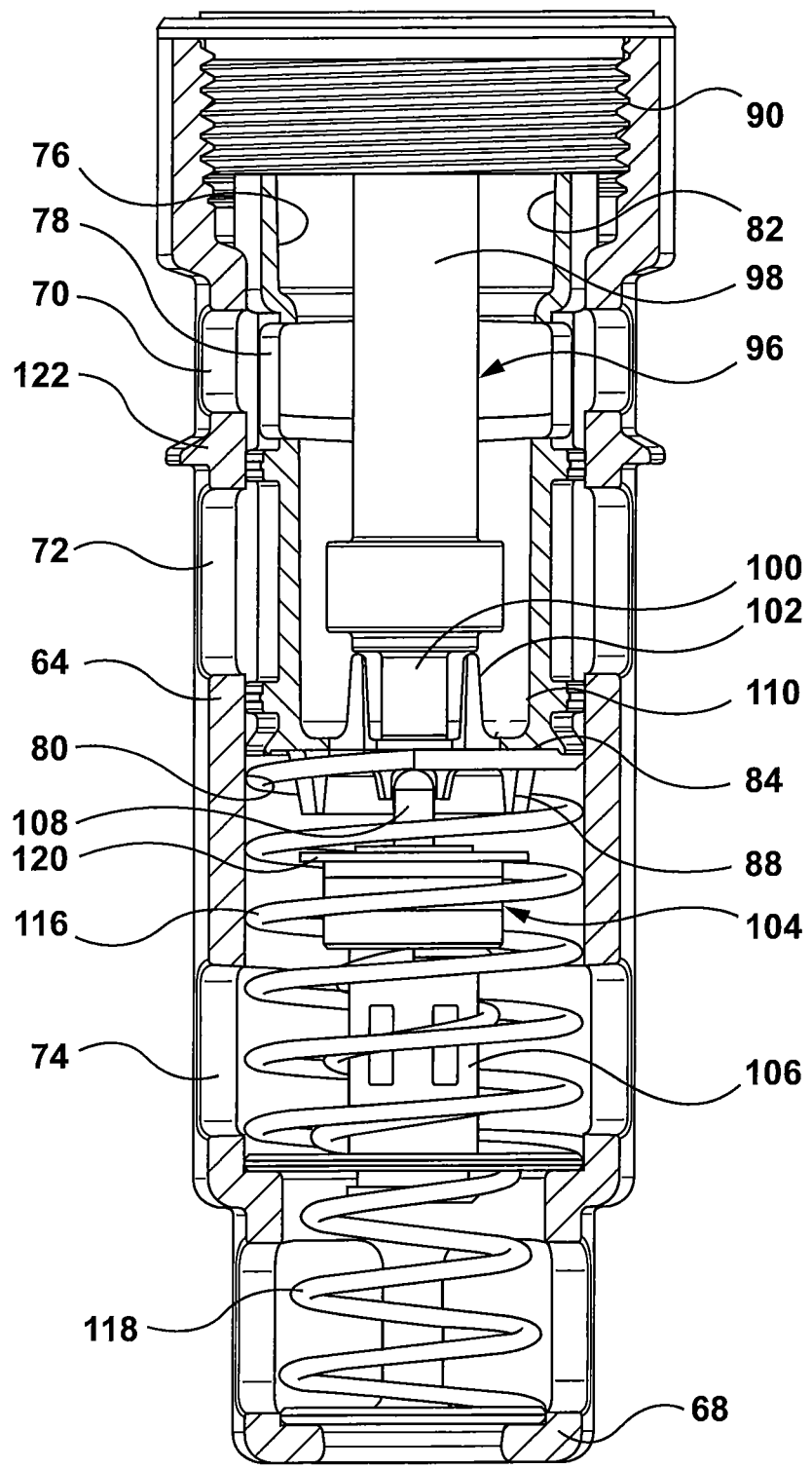

During operation, as the first fluid heats up, heat from the first fluid channels 58 is transferred to the second fluid in the second fluid channels 60, which is sensed by the second thermal actuator 104 that activates the second thermal actuator piston 108 to extend outwardly (away from the second thermal actuator body 106) (see FIGS. 7a-7c). As the second thermal actuator piston 108 protrudes from the second thermal actuator body 106, it disengages the stopper 120 from the valve seat 88 moving it from the stopper first position to the stopper second position, allowing second fluid to flow through the second orifice 86 into the outer sleeve 64 in the heat exchanger section 12. The second fluid can then flow through the second fluid channels 60 to the second fluid outlet manifold 40, and then exit through the second fluid outlet 52. As the stopper 120 moves from the stopper first position (shown in FIGS. 5 and 6) to the stopper second position (shown in FIGS. 7a-7c), the spring (second biasing means) 118 is compressed and applies pressure on the second thermal actuator 104 to move the stopper 120 from the stopper second position to the stopper first position to sit on the valve seat 88 to prevent second fluid flow through the second orifice 86.

In the condition shown in FIGS. 7a-7c, the second fluid can flow through the heat exchanger section 12 and the bypass channel section 14, as the inner sleeve 76 is in the inner sleeve first position with the first orifice 78 fluidly aligned with the first aperture 70 in the outer sleeve 64. Thus, the bypass channel 56 is open (not blocked off by the inner sleeve 76). Hence, when the first fluid is hot and the second fluid is cold, the second fluid can flow through both the bypass channel 56 and the second fluid channels 60 to permit heat exchange.

Figure 8B:
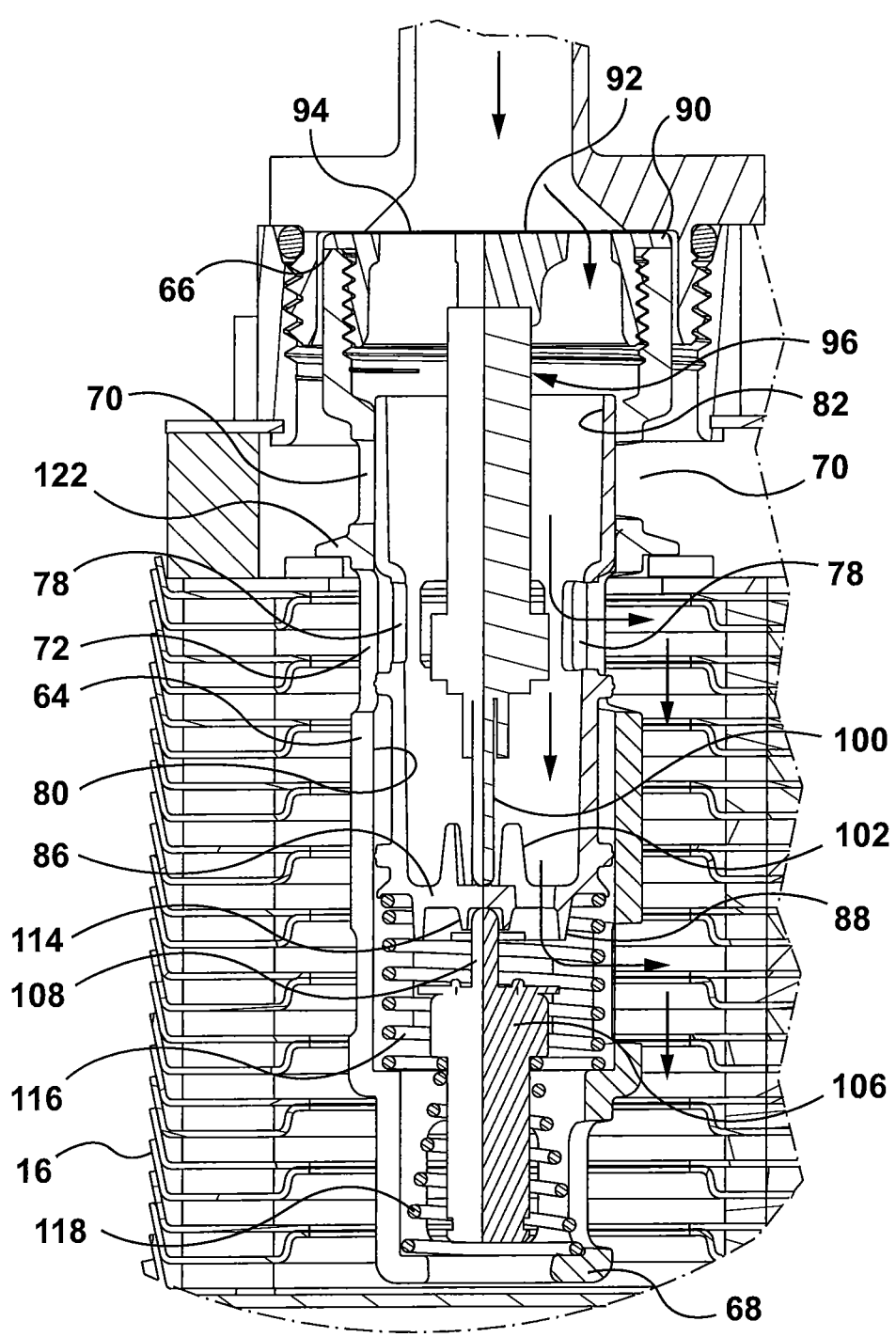
FIG. 8 shows (a) a sectional view of the heat exchanger apparatus along the lines A-A in FIG. 3, (b) an expansion of the heat exchanger apparatus with both the first and second thermal actuators in the second position, and (c) the valve assembly (removed from the heat exchanger apparatus) in the configuration shown in (b)
Figure 8C:
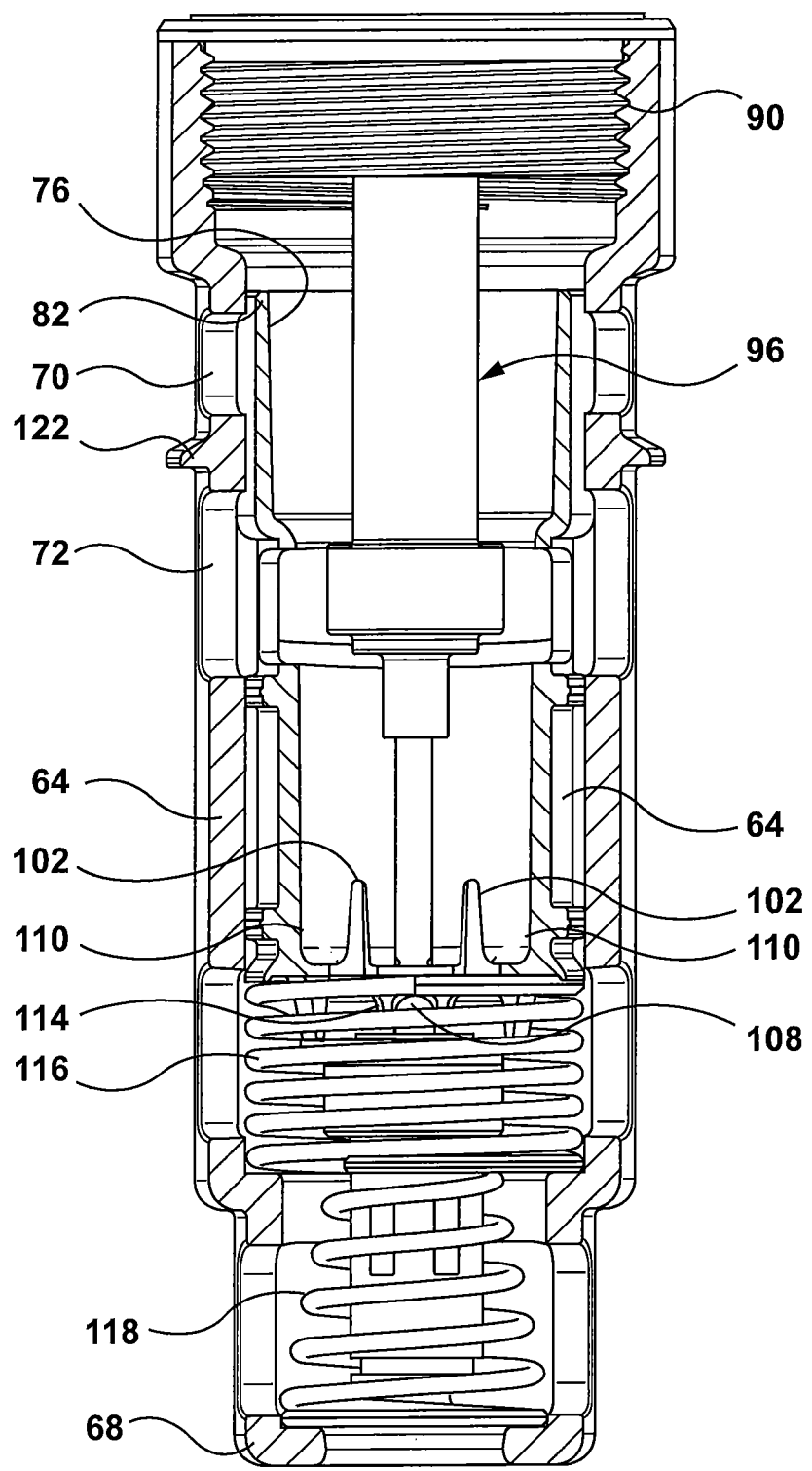

As operation of the heat exchanger apparatus 10 continues, the second fluid can warm up (FIGS. 8a-8c), which is sensed by the first thermal actuator 96 that actuates movement of the inner sleeve 76 from the inner sleeve first position (shown in FIGS. 5-7) to an inner sleeve second position (shown in FIGS. 8a-8c). The first thermal actuator piston 100 extends from the first thermal actuator body 98 pushing the inner sleeve 76 to move from the inner sleeve first position to the inner sleeve second position (shown in FIGS. 8a-8c). The inner sleeve 76 blocks off the first aperture 70 to inhibit second fluid flow through the bypass channel 56, while fluidly aligning with the second aperture 72 to permit second fluid communication from the second fluid inlet 48 to the second aperture 72 in the outer sleeve 64, thereby permitting fluid from the second fluid inlet 48 to the second fluid inlet manifold 34 in the heat exchanger section 12, and also through second fluid channels 60.

In the condition shown in FIGS. 8a-8c, with the first orifice 78 aligned with the second aperture 72 and the stopper 120 disengaged from the valve seat 88, while the bypass channel 56 being blocked off the inner sleeve 76, there is an increase of second fluid flow through the second fluid channels 60, which can help with improvement of the heat exchanger performance of the heat exchanger apparatus 10. Further, as the inner sleeve 76 moves to the inner sleeve second position, the spring 116 (first biasing means) is compressed and applies pressure on the inner sleeve 76 to move from the inner sleeve from the inner sleeve second position to the inner sleeve first position.

Figure 9B:
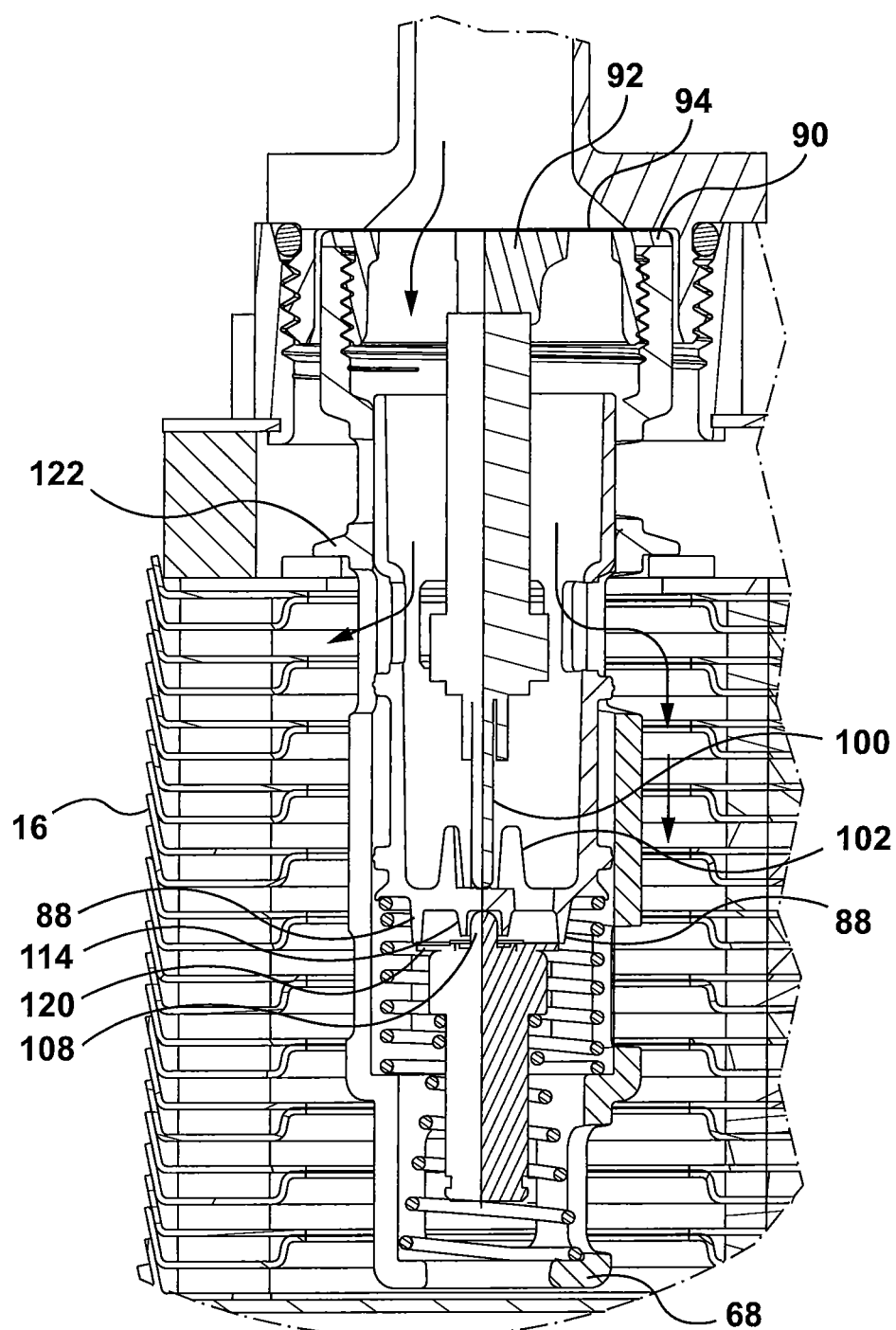
FIG. 9 shows (a) a sectional view of the heat exchanger apparatus along the lines A-A in FIG. 3, (b) an expansion of the heat exchanger apparatus with both the first thermal actuator in the first position and the second thermal actuator in the second position, and (c) the valve assembly (removed from the heat exchanger apparatus) in the configuration shown in (b)
Figure 9C:
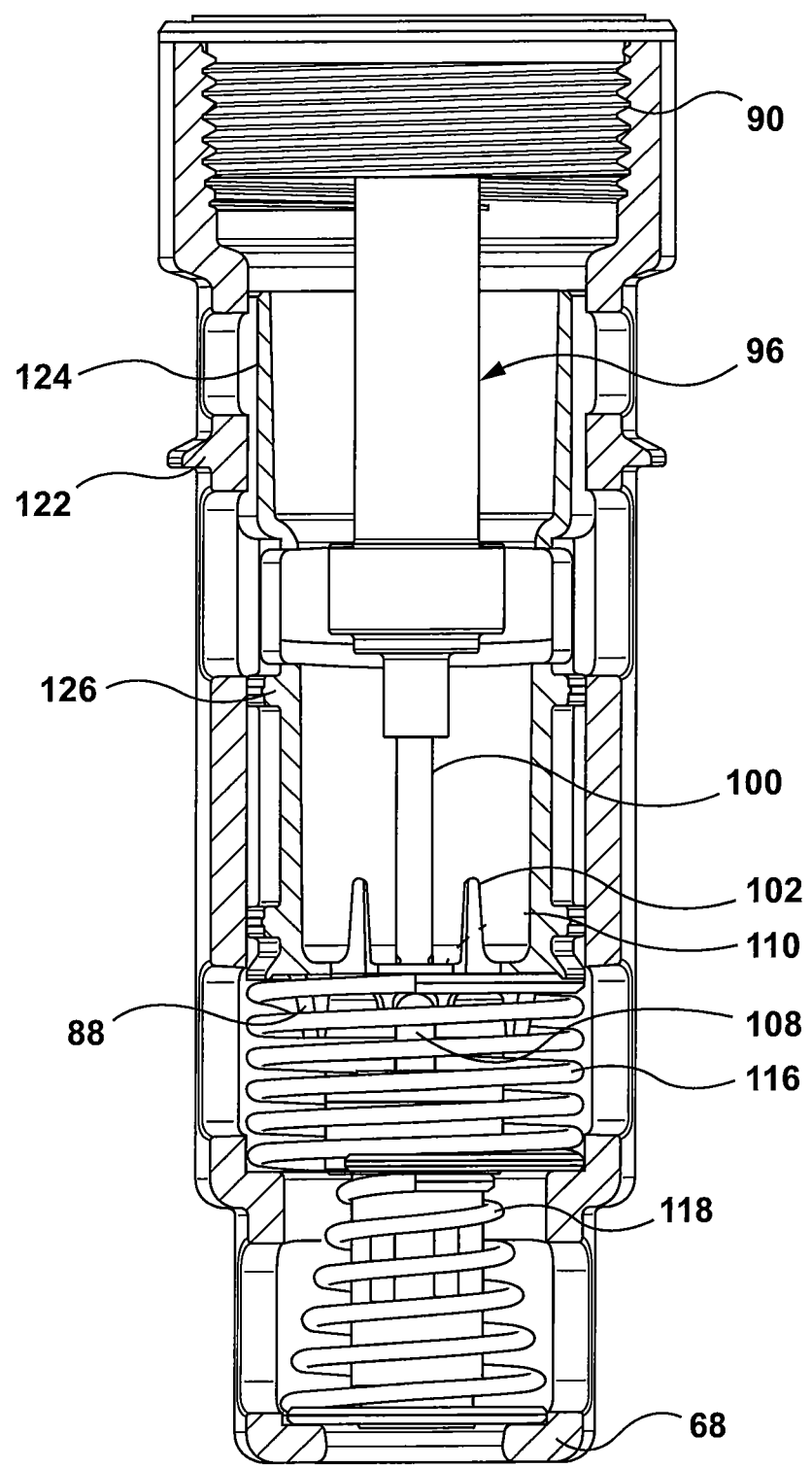

As operation of the heat exchanger apparatus 10 continues, the first fluid flowing in the first fluid channel 58 can cool down, which can be sensed by the second thermal actuator 104, as it is in contact with the second fluid that is in thermal communication with the first fluid in the fluid channels. As shown in FIGS. 9a-9c, this results in retraction of the second thermal actuator piston 108, while the spring 118 (second biasing means) pushes the stopper 120 from the stopper second position to the stopper first position, where the stopper engages the valve seat 88 to prevent second fluid flow through the second orifice 86.

In such a scenario, the second fluid flows from the second fluid inlet 48 through the first orifice 78 in the inner sleeve, which is fluidly aligned with the second aperture 72 in the outer sleeve 64, to permit the second fluid to flow in to the second fluid inlet manifold 34 in the heat exchanger section 12, and then flow through the second fluid channels 60 (see FIGS. 9a-c). Further, as the first thermal actuator piston 100 is still extended, the inner sleeve 76 is still in the inner sleeve second position, where the inner sleeve 76 inhibits second fluid flow from the second fluid inlet 48 to the bypass channel 56.

Further cooling of the second fluid results in retraction of the first thermal actuator piston 100, with the spring 116 (first biasing means) biasing the inner sleeve 76 from the inner sleeve second position to the inner sleeve first position as shown in FIGS. 5a-5c, when both the first fluid and the second fluid are at a cold temperature.

The thermal temperature actuator and their alignment in the thermal bypass valve assembly is not particularly limited and may be varied depending upon design and application requirements. The thermal temperature actuator is provided with a thermally expansive/contractable material in the thermal actuator body that can expand at higher temperatures to activate movement of the piston from the retracted state to an extended state. At lower temperatures, thermally expansive/contractable material contracts to assist with retraction of the extended piston with the thermal actuator body. The material used as the thermally expansive/contractable material is not particularly limited. In one embodiment, for example and without limitation, the thermally expansive/contractable material is wax.

Certain adaptations and modifications of the described embodiments can be made. Therefore, the above discussed embodiments are considered to be illustrative and not restrictive.

| | Parts List |
|---|---|
| 10 | HX apparatus/device/system |
| 12 | HX section |
| 14 | bypass channel section |
| 16 | plurality of HX plates |
| 18 | Top end HX plate |
| 20 | Bottom end HX plate |
| 22 | $1^{st}$ fluid inlet manifold (not shown) |
| 24 | $1^{st}$ fluid inlet fitting |
| 26 | $1^{st}$ fluid inlet |
| 28 | $1^{st}$ fluid outlet manifold (not shown) |
| 30 | $1^{st}$ fluid outlet fitting |
| 32 | $1^{st}$ fluid outlet |
| 34 | $2^{nd}$ fluid inlet manifold |
| 36 | Bypass channel inlet bracket |
| 38 | spacing b/w bypass channel inlet bracket & outer sleeve |
| 40 | $2^{nd}$ fluid outlet manifold |
| 42 | Bypass channel cover plate |
| 44 | Bypass channel vertical side walls |
| 46 | $2^{nd}$ fluid inlet fitting |
| 48 | $2^{nd}$ fluid inlet |
| 50 | $2^{nd}$ fluid outlet fitting |
| 52 | $2^{nd}$ fluid outlet |
| 54 | Bypass channel housing |
| 56 | Bypass channel |
| 58 | $1^{st}$ fluid channel |
| 60 | $2^{nd}$ fluid channel |
| 62 | a thermal bypass valve assembly |
| 64 | Outer sleeve |
| 66 | $1^{st}$ end of outer sleeve |
| 68 | $2^{nd}$ end of outer sleeve |
| 70 | $1^{st}$ aperture |
| 72 | $2^{nd}$ aperture |
| 74 | $3^{rd}$ aperture |
| 76 | Inner sleeve |
| 78 | $1^{st}$ Orifice |
| 80 | Inner wall of outer sleeve |
| 82 | $1^{st}$ end of inner sleeve |
| 84 | $2^{nd}$ end of inner sleeve |
| 86 | $2^{nd}$ orifice |
| 88 | Valve seat |
| 90 | Valve assembly cap |
| 92 | Valve assembly cap base |
| 94 | Hole (in valve base) |
| 96 | $1^{st}$ thermal actuator (TA) |
| 98 | $1^{st}$ thermal actuator body |
| 100 | $1^{st}$ thermal actuator piston |
| 102 | $1^{st}$ TA piston engaging receptacle |
| 104 | $2^{nd}$ thermal actuator |
| 106 | $2^{nd}$ thermal actuator body |
| 108 | $2^{nd}$ thermal actuator piston |
| 110 | Inner surface $2^{nd}$ end of inner sleeve |
| 112 | Outer surface at $2^{nd}$ end of inner sleeve |
| 114 | $2^{nd}$ TA piston engaging receptacle |
| 116 | $1^{st}$ biasing means |
| 118 | $2^{nd}$ biasing means |
| 120 | Stopper |
| 122 | Shoulder of outer sleeve |
| 124 | Outer wall of inner sleeve |
| 126 | Lip on outer wall of inner sleeve |
| 128 | Annulus between outer & inner sleeve |
| 130 | Edges of HX plate defining $2^{nd}$ fluid inlet manifold |

What is claimed is:

1. A heat exchanger apparatus, comprising:
a heat exchanger section comprising:
a top end heat exchanger plate, a bottom end heat exchanger plate and a plurality of heat exchanger plates positioned between the top end heat exchanger plate and the bottom end heat exchanger plate, the plurality of heat exchange plates defining a first fluid channel and a second fluid channel;

a first fluid inlet manifold having a first fluid inlet, a first fluid outlet manifold having a first fluid outlet, the first fluid channel in fluid communication with the first fluid inlet manifold and the first fluid outlet manifold;

a second fluid inlet manifold having a second fluid inlet, a second fluid outlet manifold having a second fluid outlet, the second fluid channel in fluid communication with the second fluid inlet manifold and the second fluid outlet manifold;

a bypass section coupled to the heat exchanger section, the bypass section comprising:

a bypass channel cover plate coupled to the top end heat exchanger plate, the bypass channel cover plate together with the top end heat exchanger plate defining a bypass channel with the bypass channel being in fluid communication with the second fluid inlet manifold and the second fluid outlet manifold; and a thermal bypass valve assembly positioned within the second fluid inlet manifold, the thermal bypass valve assembly comprising:

a hollow outer sleeve having an inner wall, an outer wall, a first open end, a second end, a first aperture proximate to the first open end, a second aperture and a third aperture proximate the second end, the second aperture axially displaced between the first aperture and the third aperture; the first aperture permitting fluid communication from the second fluid inlet to the bypass channel, and the second aperture and the third aperture permitting fluid communication from the second fluid inlet to the second fluid inlet manifold in the heat exchanger section;

a hollow inner sleeve positioned within the outer sleeve and moveable from a first position to a second position, the hollow inner sleeve having an inner sleeve inner wall, an inner sleeve outer wall in contact with the inner wall of the hollow outer sleeve, an inner sleeve first open end, an inner sleeve second end, a valve seat positioned at the inner sleeve second end, a first orifice, and a second orifice defined by the inner sleeve second end; the first orifice aligning with the first aperture permitting fluid communication from the second fluid inlet to the bypass channel in the first position and the first orifice aligning with the second aperture permitting fluid communication from the second fluid inlet to the second fluid inlet manifold in the heat exchanger section in the second position;

a valve assembly cap coupled at the first open end of the hollow outer sleeve, the valve assembly cap having a valve base and a hole for permitting fluid flow from the second fluid inlet to the hollow portion of the inner sleeve;

a first thermal actuator coupled to the valve base and engaging an inner surface of the hollow inner sleeve at the second end; the first thermal actuator actuating movement of the hollow inner sleeve from the first position to the second position;

a second thermal actuator positioned proximate to the second end of the hollow outer sleeve and engaging an outer surface of the hollow inner sleeve at the second end; and a stopper coupled to the second thermal actuator and moveable from a stopper first position to a stopper second position upon actuation of the second thermal actuator;

wherein the stopper engages the valve seat in the stopper first position to inhibit fluid flow from the second fluid inlet through the second orifice, and the stopper disengages from the valve seat in the stopper second position to permit fluid flow from the second fluid inlet through the second orifice.

2. The heat exchanger apparatus according to claim 1, wherein the first thermal actuator has a first thermal actuator body and a first thermal actuator piston, and the second thermal actuator has a second thermal actuator body and a second thermal actuator piston.

3. The heat exchanger apparatus according to claim 1, wherein the outer sleeve comprises a shoulder.

4. The heat exchanger apparatus according to claim 3, wherein the shoulder engages a top heat exchanger plate for fluidly sealing the bypass channel from the second fluid inlet manifold in the heat exchanger section, or wherein the shoulder engages a bracket in the bypass section for fluidly sealing the bypass channel from the second fluid inlet manifold in the heat exchanger section.

5. The heat exchanger apparatus according to claim 1, further comprising a first biasing means engaging the second end of the hollow inner sleeve for biasing the hollow inner sleeve towards the first position.

6. The heat exchanger apparatus according to claim 1, further comprising a second biasing means engaging the second actuator for biasing the stopper in the stopper first position.

7. The heat exchanger apparatus according to claim 1, wherein the valve seat comprises a projection extending from the outer surface of the second end of the hollow inner sleeve.

8. The heat exchanger apparatus according to claim 1, wherein the stopper comprises a disc, the disc coupled to the body of the second thermal actuator proximate to the second thermal actuator piston.

9. The heat exchanger apparatus according to claim 2, wherein the inner sleeve further comprises a first thermal actuator piston receiving seat at the inner surface of the hollow inner sleeve, the first thermal actuator piston receiving seat positioned proximate to the second end of the hollow inner sleeve and adapted for receiving the first thermal actuator piston.

10. The heat exchanger apparatus according to claim 2, wherein the inner sleeve further comprises a second thermal actuator piston receiving seat at the outer surface of the hollow inner sleeve, the second thermal actuator piston receiving seat positioned proximate to the second end of the hollow inner sleeve and adapted for receiving the second thermal actuator piston.

11. A thermal bypass valve assembly comprising:
a hollow outer sleeve having an inner wall, an outer wall, a first open end, a second end, a first aperture proximate to the first open end, a second aperture and a third aperture proximate the second end, the second aperture axially displaced between the first aperture and the third aperture;

a hollow inner sleeve positioned within the outer sleeve and moveable from a first position to a second position, the hollow inner sleeve having an inner sleeve inner wall, an inner sleeve outer wall in contact with the inner wall of the hollow outer sleeve, an inner sleeve first open end, an inner sleeve second end, a valve seat positioned at the inner sleeve second end, a first orifice, and a second orifice defined by the inner sleeve second end; the first orifice aligning with the first aperture in the first position and the first orifice aligning with the second aperture in the second position;

a valve assembly cap coupled at the first open end of the hollow outer sleeve, the valve assembly cap having a valve base and a hole for permitting fluid flow to the hollow portion of the inner sleeve;

a first thermal actuator coupled to the valve base and engaging an inner surface of the hollow inner sleeve at the second end; the first thermal actuator actuating movement of the hollow inner sleeve from the first position to the second position;

a second thermal actuator positioned proximate to the second end of the hollow outer sleeve and engaging an outer surface of the hollow inner sleeve at the second end; and a stopper coupled to the second thermal actuator and moveable from a stopper first position to a stopper second position upon actuation of the second thermal actuator;

wherein the stopper engages the valve seat in the stopper first position to inhibit fluid flow through the second orifice, and the stopper disengages from the valve seat in the stopper second position to permit fluid flow through the second orifice.

12. The thermal bypass valve assembly according to claim 11, wherein the first thermal actuator has a first thermal actuator body and a first thermal actuator piston, and the second thermal actuator has a second thermal actuator body and a second thermal actuator piston.

13. The thermal bypass valve assembly according to claim 11, wherein the outer sleeve comprises a shoulder.

14. The thermal bypass valve assembly according to claim 11, further comprising a first biasing means engaging the second end of the hollow inner sleeve for biasing the hollow inner sleeve towards the first position.

15. The thermal bypass valve assembly according to claim 11, further comprising a second biasing means engaging the second actuator for biasing the stopper in the stopper first position.

16. The thermal bypass valve assembly according to claim 11, wherein the valve seat comprises a projection extending from the outer surface of the second end of the hollow inner sleeve.

17. The thermal bypass valve assembly according to claim 11, wherein the stopper comprises a disc, the disc coupled to the body of the second thermal actuator proximate to the second thermal actuator piston.

18. The thermal bypass valve assembly according to claim 12, wherein the inner sleeve further comprises a first thermal actuator piston receiving seat at the inner surface of the hollow inner sleeve, the first thermal actuator piston receiving seat positioned proximate to the second end of the hollow inner sleeve and adapted for receiving the first thermal actuator piston.

19. The thermal bypass valve assembly according to claim 12, wherein the inner sleeve further comprises a second thermal actuator piston receiving seat at the outer surface of the hollow inner sleeve, the second thermal actuator piston receiving seat positioned proximate to the second end of the hollow inner sleeve and adapted for receiving the second thermal actuator piston.

20. A heat exchanger apparatus comprising:
a first fluid channel, a second fluid channel, a bypass channel, and inlet and outlet manifolds;
a thermal bypass valve assembly positioned within the inlet manifold, the thermal bypass valve containing
an outer sleeve having a first aperture, a second aperture and a third aperture axially displaced;
an inner sleeve positioned within the outer sleeve and moveable from a first position to a second position upon actuation of a first thermal actuator; the inner sleeve defining a first orifice on a wall of the inner sleeve and a second orifice defined by an inner sleeve second end; wherein the first orifice aligns with the first aperture in the first position and the second aperture in the in the second position;
a second thermal actuator coupled to a stopper that disengages from the second orifice upon actuation of the second actuator.

* * * * *